United States Patent
Matsumura

(10) Patent No.: US 8,813,924 B2
(45) Date of Patent: Aug. 26, 2014

(54) MANUFACTURING METHOD FOR UPPER SUPPORT AND UPPER SUPPORT

(75) Inventor: Hiroyuki Matsumura, Komaki (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 164 days.

(21) Appl. No.: 13/562,726

(22) Filed: Jul. 31, 2012

(65) Prior Publication Data

US 2012/0292149 A1 Nov. 22, 2012

Related U.S. Application Data

(63) Continuation of application No. PCT/JP2011/069806, filed on Aug. 31, 2011.

(30) Foreign Application Priority Data

Sep. 28, 2010 (JP) ................................. 2010-217889
Mar. 11, 2011 (JP) ................................. 2011-054520

(51) Int. Cl.
*F16F 9/54* (2006.01)
*F16F 1/38* (2006.01)
*B60G 15/06* (2006.01)

(52) U.S. Cl.
CPC ........ *B60G 15/068* (2013.01); *B60G 2204/128* (2013.01); *B60G 2204/41* (2013.01); *F16F 1/3842* (2013.01); *F16F 9/54* (2013.01)
USPC ..................... 188/321.11; 267/220

(58) Field of Classification Search
CPC ....... F16F 1/3814; F16F 9/54; F16F 2228/08; B60G 13/001
USPC ........... 188/321.11; 267/220, 293; 29/896.93; 72/370.24
See application file for complete search history.

(56) References Cited

U.S. PATENT DOCUMENTS 4,486,028 A * 12/1984 Tanahashi .............. 280/124.155
4,568,067 A * 2/1986 Iwata ............................ 267/220
4,798,370 A * 1/1989 Inuzuka ........................ 267/220

(Continued)

FOREIGN PATENT DOCUMENTS

| JP | H11-201218 | 7/1999 |
| JP | 2003-090374 | 3/2003 |
| JP | 2004-270947 | 9/2004 |
| JP | 2004-278601 | 10/2004 |

(Continued)

*Primary Examiner* — Anna Momper
(74) *Attorney, Agent, or Firm* — Greenblum & Bernstein, P.L.C.

(57) ABSTRACT

When manufacturing an upper support which includes a cup piece as an inner piece, an outer piece, and a rubber elastic body integrally vulcanize adhered thereto, the shape of a tubular portion of a cup piece before integral vulcanized adhesion with the rubber elastic body is a shape having a large diameter portion at a top portion continuous with a flanged portion, a small diameter portion at a bottom portion, and a stepped portion therebetween. Following integral vulcanized adhesion with the rubber elastic body, only the small diameter portion is diameter widened by press-fitting a diameter widening jig to impart pre-compression to the rubber elastic body. No roll-back deformation of a flanged portion occurs when integrally vulcanize adhering the cup piece to the rubber elastic body, and also when imparting pre-compression to the rubber elastic body by diameter widening a tubular portion of the cup piece.

11 Claims, 13 Drawing Sheets

(56) References Cited

U.S. PATENT DOCUMENTS

| | | | | |
|---|---|---|---|---|
| 5,342,029 | A * | 8/1994 | Carter | 267/220 |
| 6,616,160 | B2 * | 9/2003 | Tadano | 280/124.147 |
| 6,969,053 | B2 * | 11/2005 | Kawada et al. | 267/292 |
| 7,918,438 | B2 * | 4/2011 | Sato et al. | 267/140.13 |
| 2005/0247531 | A1 | 11/2005 | Oota | |
| 2006/0131119 | A1 * | 6/2006 | Ishikawa | 188/321.11 |
| 2010/0295224 | A1 | 11/2010 | Namito et al. | |

FOREIGN PATENT DOCUMENTS

| | | |
|---|---|---|
| JP | 2005-256991 | 9/2005 |
| JP | 2007-010005 | 1/2007 |
| JP | 2007-130650 | 5/2007 |
| JP | 2009-030664 | 2/2009 |
| JP | 2009144888 A * | 7/2009 |
| WO | 2009/078410 | 6/2009 |

* cited by examiner

MANUFACTURING METHOD FOR UPPER SUPPORT AND UPPER SUPPORT

CLAIM OF PRIORITY

This application is a continuation of PCT/JP2011/069806 filed Aug. 31, 2011, and claims the priority benefit of Japanese Applications No. 2010-217889, filed Sep. 28, 2010, and No. 2011-054520, filed Mar. 11, 2011, the contents of which is expressly incorporated by reference in its entirety.

FIELD OF THE INVENTION

The present invention relates to a manufacturing method for an upper support and an upper support elastically connecting a piston rod for a shock absorber in a suspension of a vehicle to a vehicle body, and acting to prevent vibration therebetween.

BACKGROUND OF THE INVENTION

Conventionally, a vehicle body and a piston rod for a shock absorber making up an element of a suspension in a vehicle have been elastically connected by an upper support. Vibration has been prevented or inhibited from being transferred from the shock absorber to the vehicle body side with the anti-vibration action of the upper support.

Technology having a variety of types and forms is conventionally known for such an upper support. One such known upper support includes (a) an inner piece, (b) an outer piece disposed around the inner piece in a position offset in a radial direction, and (c) a rubber elastic body integrally vulcanize adhered to the inner piece and the outer piece in a state where the inner piece and the outer piece are elastically connected thereto. On the inner piece side, the upper support is anchored to a piston rod of a shock absorber, and on the outer piece side, the upper support is anchored to a vehicle body, thus acting to prevent vibration between the vehicle body and the shock absorber through elastic deformation of the rubber elastic body.

In this type of upper support, after integral vulcanized adhesion of the inner piece, the outer piece, and the rubber elastic body, contraction stress on the rubber elastic body due to cooling is to be alleviated to prevent the development of cracks therein, and durability of the rubber elastic body is to be improved during use. Therefore, pre-compression is imparted to the rubber elastic body following the vulcanized adhesion.

As a means for imparting the pre-compression, there is a method in which, generally, squeezing is performed on the outer piece to constrict the diameter thereof, thus pre-compressing the rubber elastic body. However, depending on the upper support, the shape and structure of the outer piece may be complex and there are cases where squeezing cannot be performed on the outer piece. In such cases, a method is employed in which pre-compression is imparted to the rubber elastic body by widening the diameter of the inner piece.

As a method of this kind, conventional art is commonly known including a base portion having a tubular portion and a piston rod insertion hole in the center of a bottom end of the tubular portion, and a flanged portion acting as a rebound stopper and jutting in a radially outward direction at a top end of the tubular portion opposite to the base portion. A cup piece serving as a rebound stopper piece is press-fitted into the cylindrical inner piece to widen the diameter of the inner piece and thus impart pre-compression to the rubber elastic body. This kind of technology is disclosed in, for example, Related Art 1 and Related Art 2.

FIG. 12 illustrates a concrete example of the technology disclosed in Related Art 1. In the figure, 200 is a cylindrical inner piece integrally vulcanize adhered to a rubber elastic body 202, and 204 is a cup piece forming a separate body from the inner piece 200 and including a cylindrical tubular portion 206, a base portion 208, and a flanged portion 210. Herein, the tubular portion 206 of the cup piece 204 is press-fitted downward in the drawing into the inner piece 200, thereby widening the diameter of the inner piece 200 and imparting pre-compression to the rubber elastic body 202.

Furthermore, in the art shown in FIG. 12, by differing the radial direction dimensions of a top portion 206a and a bottom portion 206b of the tubular portion 206, the degree of diameter widening differs at the top portion and the bottom portion with respect to the cylindrical inner piece 200, which has a straight shape in an axial direction (vertical direction in the drawing), prior to diameter widening.

In recent years, reducing fuel costs and expenses for vehicles has been strongly pursued and, as part of this, there has also been a strong demand for making an upper support lightweight and for reducing the cost thereof. Thus, by using a cup piece as an inner piece, integrally vulcanize adhering a rubber elastic body thereto, then imparting pre-compression to the rubber elastic body by widening the diameter of the tubular portion of the cup piece, it is possible to omit the cylindrical inner piece.

Here, the inventors of the present invention have identified that a negative circumstance arises in which, as shown in FIG. 13, deformation occurs where the flange 210 is flexed upward, as shown by the two-dot dashed line in the figure, upon attempting to impart pre-compression to the rubber elastic body (omitted from the drawing) by widening the diameter of the tubular portion 206 by press-fitting a diameter-widening jig 212 therein. The outer circumferential surface of the diameter widening jig 212 has a straight shape corresponding to the straight shape in the vertical direction (axial direction of the cup piece 204, vertical direction when mounted to the vehicle) of the tubular portion 206 of the cup piece 204. It is thought that this deformation is due to a tensile force, in the direction indicated by an arrow in the figure, accompanying diameter widening deformation of the tubular portion 206 and acting on a top surface of the flanged portion 210, which is continuous with the inner circumferential surface of the tubular portion 206.

When such roll-back deformation of the flanged portion 210 occurs, a reformative process to correct the deformation becomes necessary as an extraneous additional process. When the process to correct the roll-back deformation has been performed, a negative situation occurs in which variability arises in the reformative process. Thus, a further negative situation occurs in which a hole provided on the flanged portion 210 for mounting to the vehicle may be deformed, and the like.

Besides this, when the tubular portion 206 of the cup piece is deformed to widen the diameter with the above-described method, there is a risk that a portion running from the bottom end of the tubular portion 206 to the base portion 208 may be warped or stressed by being greatly extended and, thus, a crack k may develop in these portions.

RELATED ART

Patent Literature

Related Art 1: WIPO Publication No. 2009/078410
Related Art 2: Japanese Patent Laid-open Publication No. 2009-30664

SUMMARY OF THE INVENTION

Problems to Be Solved by the Invention

With the above circumstances as background, the present invention has been conceived to provide a manufacturing method for an upper support and an upper support in which a cup piece serving also as a rebound stopper piece is integrally vulcanize adhered as an inner piece to a rubber elastic body, thereby enabling a cylindrical inner piece necessitated as a separate body by the conventional art to be omitted. Pre-compression may then be imparted to the rubber elastic body by widening the diameter of the tubular portion of the cup piece without causing roll-back deformation of a flanged portion in the process.

Means for Solving the Problems

Claim 1 relates to a manufacturing method for an upper support, the upper support including: (a) an inner piece, (b) an outer piece disposed around the inner piece in a position offset in a radial direction, and (c) a rubber elastic body integrally vulcanize adhered to the inner piece and the outer piece in a state where the inner piece and the outer piece are elastically connected thereto. On the inner piece side, the upper support is anchored to a piston rod for a shock absorber, and on the outer piece side, the upper support is anchored to a vehicle body. The upper support elastically supports the piston rod and the vehicle body, and acts to prevent vibration. A cup piece includes a tubular portion, a base portion having a piston rod insertion hole in the center of a bottom end of the tubular portion, and a flanged portion acting as a rebound stopper and jutting in a radially outward direction at a top end of the tubular portion on a side opposite to the base portion. The cup piece also serving as a rebound stopper piece forms the inner piece and is integrally vulcanize adhered directly to the rubber elastic body. The cup piece is provided such that the shape of the tubular portion prior to integral vulcanized adhesion with the rubber elastic body is a shape having an upper portion continuous with the flanged portion as a large diameter portion, a lower portion on the base portion side as a small diameter portion, and a portion between the large diameter portion and the small diameter portion as a stepped portion. An inner diameter of the large diameter portion is set to an inner diameter obtained as a dimension following diameter widening of the tubular portion. Following integral vulcanized adhesion with the rubber elastic body, the small diameter portion is diameter widened by press-fitting of a diameter widening jig into the small diameter portion to impart pre-compression to a portion of the rubber elastic body corresponding to the small diameter portion. Meanwhile, diameter widening is not performed on the large diameter portion, which retains its dimensions and shape.

In claim 2, according to claim 1, the small diameter portion is diameter widened until the inner diameter of an upper end of the small diameter portion becomes the same inner diameter as the inner diameter of the large diameter portion and the stepped portion is eliminated.

In claim 3, according to claim 2, the inner circumferential surface of the large diameter portion and the inner circumferential surface of the small diameter portion up to the bottom end of the portion where pre-compression is imparted to the rubber elastic body are made to have a continuous, straight shape in the axial direction by diameter widening of the small diameter portion.

In claim 4, according to any of claims 1 to 3, the outer piece is provided with an outer tubular portion having a shape surrounding the tubular portion of the cup piece at a position offset in a radially outward direction. The rubber elastic body has a tubular main body rubber portion sandwiched between the tubular portion of the cup piece and the outer tubular portion in a radial direction. Pre-compression is imparted to the main body rubber portion by diameter widening of the small diameter portion.

In claim 5, according to claim 4, the rubber elastic body is provided with a scooped-out portion at an axial direction position where the stepped portion is positioned. The scooped-out portion has an annular shape along a circumferential direction and is oriented in a radially inward direction from the outer circumferential surface toward the stepped portion. In the rubber elastic body, the main body rubber portion to which pre-compression is imparted by diameter widening of the small diameter portion and a stopper rubber portion on a rebound side on a bottom surface of the flanged portion leave a thin rubber portion on the outer circumferential surface of the stepped portion. The thin rubber portion has a thin wall thickness and the movement thereof is restricted by an adhesive. Thus, the rubber elastic body is vertically divided by the scooped-out portion in an axial direction across the entire radial direction.

In claim 6, according to either one of claims 4 and 5, the rubber elastic body includes an upward scooped-out portion forming an annular shape in a circumferential direction and oriented upward from a bottom surface. The upward scooped-out portion is between the tubular portion of the cup piece and the outer tubular portion of the outer piece. The main body rubber portion is formed on the upper side of the scooped-out portion.

In claim 7, according to claim 4, the outer piece is provided with a stopper abutment on the rebound side opposite the flanged portion to be continuous with the outer tubular portion. In addition, the rubber elastic body includes a top rubber portion on the upper side of the main body rubber portion, the top rubber portion having a coating rubber layer which coats the top surface of the stopper abutment. The rubber elastic body is provided with the scooped-out portion at an axial direction position where the stepped portion is positioned. The scooped-out portion has an annular shape along a circumferential direction and is oriented in a radially inward direction from the outer circumferential surface toward the stepped portion. In the rubber elastic body, the main body rubber portion and the top rubber portion are divided from the stopper rubber portion on the rebound side on the bottom surface of the flanged portion, leaving a thin rubber portion on the outer circumferential surface of the stepped portion. The thin rubber portion has a thin wall thickness and the movement thereof is restricted by an adhesive. Thus, the rubber elastic body is vertically divided by the scooped-out portion in an axial direction across the entire radial direction. In addition, the outer tubular portion is provided with an inclined shape widening downward where the gap with the tubular portion of the cup piece widens toward the bottom. Further, the rubber elastic body includes an upward scooped-out portion forming an annular shape in a circumferential direction and oriented upward from a bottom surface. The upward scooped-out portion is between the tubular portion of the cup piece and the outer tubular portion of the outer piece. The main body rubber portion is formed on the upper side of the scooped-out portion.

In claim 8, according to one of claims 6 and 7, the diameter widening jig is provided with an outer circumferential surface on the front end of the press-fitting side as a tapered portion having a shape in which an outer diameter gradually reduces toward the forefront thereof. The tapered portion is provided with a shape in which a top edge position is positioned even with or below the top end of the upward scooped-out portion in a state where press-fitting of the diameter widening jig has been completed.

In claim 9, from claim 8, the dimension widening jig widens with the tapered portion the diameter of a portion of the small diameter portion corresponding to the upward scooped-out portion.

In claim 10, from any of claims 1 to 9, the diameter widening jig is press-fitted into the small diameter portion to widen the diameter thereof. As the diameter widening jig, a body is used having a hole opening on the front end surface on the press-fitting side and extending in an axial direction from the front end surface. In addition, a receiving jig receiving the base portion of the cup piece from below is prepared, then a guide pin is projected upward from the receiving jig. In a state where the base portion is received by the receiving jig and the guide pin is projected upward from an insertion hole on the base portion, while inserting the guide pin into the hole, the diameter widening jig is press-fitted downward into the small diameter portion to widen the diameter of the small diameter portion. Thereafter, the receiving jig is removed along with the guide pin. In addition, a diameter-widened article is vertically flipped and, in a state where the flanged portion of the cup piece is received from below by a second receiving jig, an extraction pin is pushed downward into the hole of the diameter widening jig, which is in a fixed state press-fitted into the small diameter portion, in order to remove the diameter widening jig from the cup piece.

Claim 11 relates to an upper support including: (a) an inner piece, (b) an outer piece disposed around the inner piece in a position offset in a radial direction, and (c) a rubber elastic body integrally vulcanize adhered to the inner piece and the outer piece in a state where the inner piece and the outer piece are elastically connected thereto. On the inner piece side, the upper support is anchored to a piston rod of a shock absorber, and on the outer piece side, the upper support is anchored to a vehicle body. The upper support elastically supports the piston rod and the vehicle body, and acts to prevent vibration. A cup piece includes a tubular portion, a base portion having a piston rod insertion hole in the center of a bottom end of the tubular portion, and a flanged portion acting as a rebound stopper and jutting in a radially outward direction at a top end of the tubular portion on a side opposite to the base portion. The cup piece also serving as a rebound stopper piece forms the inner piece and is integrally vulcanize adhered directly to the rubber elastic body. The lower portion of the base portion in the cup piece is partially diameter widened in an axial direction; thereby, pre-compression is imparted to a portion corresponding to the lower portion in the rubber elastic body.

Effect of the Invention

As described above, the invention of claim 1 is provided such that the cup piece also serving as the rebound stopper piece forms the inner piece and is integrally vulcanize adhered directly to the rubber elastic body. The cup piece is provided such that the shape of the tubular portion prior to integral vulcanized adhesion with the rubber elastic body is a shape having an upper portion continuous with the flanged portion as a large diameter portion, a lower portion on the base portion as a small diameter portion, and a portion between the large diameter portion and the small diameter portion as a stepped portion. Following integral vulcanized adhesion with the rubber elastic body, the small diameter portion is diameter widened by press-fitting a diameter widening jig into the small diameter portion to impart pre-compression to a portion of the rubber elastic body corresponding to the small diameter portion. Meanwhile, diameter widening is not performed on the large diameter portion, which retains its pre-established dimensions and shape.

In the manufacturing method of claim 1, the cylindrical inner piece conventionally necessitated as a separate body from the cup piece can be omitted, thus enabling the upper support to be made lightweight and to reduce the costs thereof. In addition, by widening the diameter of the tubular portion of the cup piece, pre-compression is imparted to the rubber elastic body, at which time deformation is not introduced to the upper portion of the tubular portion which continues to the flanged portion because diameter widening is performed only on the small diameter portion and is not performed on the upper portion of the tubular portion. Accordingly, upward roll-back deformation of the flanged portion of the cup piece due to diameter widening can be prevented. By diameter widening the small diameter portion, the small diameter portion elongates in a diameter widening direction. Thus, even when the small diameter portion is deformed, the large diameter portion, where deformation does not occur, exists between the small diameter portion and the flanged portion and so the tensile force accompanying deformation of the small diameter portion is blocked by the large diameter portion. The tensile force thus does not work on the upper surface of the flanged portion and accordingly, roll-back deformation of the flanged portion can be favorably prevented. Therefore, following diameter widening on the cup piece, a process to correct the shape of the flanged portion can be unnecessary, and therefore again, the negative circumstance of variation which arises in the reformative process can be eliminated. In addition, deformation due to deformation of the flanged portion can also be prevented for holes provided on the flanged portion for mounting on the vehicle body.

In such a case, the inner diameter of the upper end of the small diameter portion is made the same diameter as the inner diameter of the large diameter portion. Thus, the diameter of the small diameter portion can be widened until the stepped portion is removed (claim 2).

Furthermore, in such a case, the inner circumferential surface of the large diameter portion and the inner circumferential surface of the small diameter portion (specifically, the inner circumferential surface up to the bottom end of the portion at which pre-compression is imparted to the rubber elastic body) can be made to have a straight shape in an axial direction made continuous by the diameter widening of the small diameter portion (claim 3).

In the present invention, the outer piece is provided with an outer tubular portion having a shape surrounding the tubular portion of the cup piece at a position offset in a radially outward direction. The rubber elastic body has a tubular main body rubber portion sandwiched between the tubular portion and the outer tubular portion in a radial direction. Pre-compression is imparted to the main body rubber portion by diameter widening of the small diameter portion (claim 4). By doing this, pre-compression can be effectively imparted to the main body rubber portion, which intrinsically requires pre-compression, by diameter widening the small diameter portion.

In the present invention, the rubber elastic body is provided with a scooped-out portion at an axial direction position where the stepped portion is positioned. The scooped-out portion has an annular shape along a circumferential direction and is oriented in a radially inward direction from the outer circumferential surface toward the stepped portion. In the rubber elastic body, the main body rubber portion to which pre-compression is imparted by diameter widening of the small diameter portion and a stopper rubber portion on a rebound side on a bottom surface of the flanged portion can be separated in an axially vertical direction by the scooped-out portion across the entire radial direction (specifically, across the entire radial direction leaving a thin rubber portion on the outer circumferential surface of the stepped portion, the movement thereof being restricted by an adhesive) (claim 5).

For example, when the stopper rubber portion on the rebound side is provided to the main body rubber portion side and, in addition, to an outer circumferential side of the stepped portion continuous thereto, this portion is the cup piece (that is, a portion to which pre-compression is not imparted by diameter widening of the small diameter portion). When the cup piece is repeatedly mutually displaced in a mutually vertical direction with respect to the outer piece, there is a risk that the tensile stress and the like acting on the portion to which pre-compression is not imparted will produce cracks therein, and that cracks originating here will progress deep into the interior of the rubber elastic body and grow.

In consideration of this, claim 5 provides a stopper rubber portion on the rebound side on the bottom surface of the flanged portion of the cup piece. The stopper rubber portion is separated from the main body rubber portion side by the inward scooped-out portion, which spans the entire radial direction. According to claim 5, the occurrence of a rubber portion in which pre-compression is not imparted on the outer circumference of the stepped portion can be substantially prevented, and the development of cracks at the portion to which pre-compression is not imparted can be effectively inhibited.

Further, when the inward scooped-out portion is formed deeply to reach the stepped portion, the main body rubber portion side and the stopper rubber portion on the rebound side can be completely separated. However, in such a case, at the time of molding the rubber elastic body, a cavity in a molding form for molding the components is also completely separated, and it is difficult to favorably mold the main body rubber portion side and the stopper rubber portion at the same time by injection of rubber materials. Hence, in claim 5, the main body rubber portion side and the stopper rubber portion side are connected by the thin rubber portion, and can thus be favorably molded simultaneously.

However, in a case where the rubber portion connecting the components is thick, when the cup piece serving as the inner piece is mutually displaced (particularly when mutually displaced in a vertical direction) with respect to the outer piece, a shift in the rubber develops at the rubber portion connecting the main body rubber portion side and the stopper rubber portion. Accordingly, large localized distortion and stress repeatedly occurs there, thus causing a risk that cracks may develop in the portion.

Hence, herein, the thin rubber portion is left to separate the main body rubber portion side and the stopper rubber portion side. Moreover, the movement of the thin rubber portion is restricted by the adhesive, and thus the development of cracks in the portion is favorably inhibited. Further, for a thickness effectively restricting movement with the adhesive, the thickness of the thin rubber portion is preferably provided at a thickness of 2 mm or less.

In the present invention, the shape of the rubber elastic body can include an upward annular scooped-out portion oriented upward from the bottom surface between the tubular portion of the cup piece and the outer tubular portion of the outer piece. The main body rubber portion can be formed on the upper side of the scooped-out portion (claim 6).

When the small diameter portion of the tubular portion in the cup piece is diameter widened and pre-compression has thus been imparted to the rubber elastic body, there is a risk that changes might occur in an axial direction mutual position of the cup piece with respect to the outer piece due to a reactive force of the compressed rubber elastic body. In response to this, according to claim 7, such misalignment of the axial direction mutual position of the cup piece can be effectively inhibited. Thus, the development of tensile warping caused thereby in the rubber elastic body, and in particular in the thin rubber portion and the vicinity thereof, can be favorably inhibited.

The diameter widening jig can be provided with an outer circumferential surface on the front end of the press-fitting side as a tapered portion having a shape in which the outer diameter gradually reduces toward the forefront thereof. The tapered portion can be provided with a shape in which a top edge position is positioned even with or below the top end of the upward scooped-out portion in a state where press-fitting of the diameter widening jig is complete (claim 8).

By providing the outer circumferential surface of the front end on the diameter widening jig as a tapered portion of this kind, when the diameter of the small diameter portion is widened by the diameter widening jig, the development of cracks in a portion running from the bottom end on the base portion of the small diameter portion to the base portion can be effectively prevented. Further, by providing such a tapered portion to the diameter widening jig, the diameter widening jig can be smoothly press-fitted in an axial direction into the tubular portion of the cup piece to widen the diameter of the small diameter portion.

At a portion where the upward scooped-out portion is provided, even when the small diameter portion in the cup piece is diameter widened, there is no effect from imparting pre-compression to the rubber elastic body (specifically, the main body rubber portion). As such, in claim 8, the outer circumferential surface of the front end of the diameter widening jig corresponding to the upward scooped-out portion is provided as the tapered portion.

In such a case, the tapered portion can be provided to be non-contacting with the inner circumferential surface of the tubular portion of the cup piece during press-fitting of the diameter widening jig. Alternatively, the tapered portion can contact the inner circumferential surface to widen the diameter of the small diameter portion.

However, in the latter case, in a state where press-fitting of the diameter widening jig is complete, the tapered portion positions the top end thereof higher than the top end of the upward scooped-out portion. In such a case, there is a risk that there may be a portion where the pre-compression was inadequately imparted on the bottom end side of the main body rubber portion, and cracks may develop therefrom. Accordingly, in claim 8, even when the small diameter portion is diameter widened by the tapered portion, the top end of the tapered portion is positioned to be even with or below the top end of the scooped-out portion, and the diameter of the portion of the small diameter portion corresponding to the upward scooped-out portion is widened by the tapered portion (claim 9).

Herein, the tapered portion refers to anything having an angle θ greater than 0° with respect to the outer circumferential face of the diameter widening jig which forms a straight shape in the axial direction, and having a height of 3 mm or more from the front end surface of the diameter widening jig. Otherwise, during diameter widening by press-fitting of the diameter widening jig, it is difficult to effectively prevent the development of cracks as described above.

In the process to press-fit the diameter widening jig into the small diameter portion in order to widen the diameter thereof, anything having a hole opening on the front end surface on the press-fitting side and extending in an axial direction therefrom can be used as the diameter widening jig. In addition, a receiving jig receiving the base portion of the cup piece from below can be prepared, and a guide pin can be projected upward from the receiving jig. Also, in a state where the base portion is received by the receiving jig and the guide pin is projected upward from an insertion hole in the base portion, while inserting the guide pin into the hole, the diameter widening jig can be press-fitted downward into the small diameter portion to widen the diameter of the small diameter portion.

Further, thereafter, the receiving jig is removed along with the guide pin and, in addition, in a state where the diameter widened article is vertically flipped and the flanged portion of the cup piece is received from below by a second receiving jig, an extraction pin can be pushed downward into the hole of the diameter widening jig which is in a fixed state press-fitted into the small diameter portion, then the diameter widening jig can be removed from the cup piece (claim 10). When done in this way, the diameter widening of the small diameter portion by the diameter widening jig can be smoothly and favorably performed, and the diameter widening jig which is in a fixed state press-fitted inside the cup piece can be favorably removed from the cup piece.

Moreover, when the diameter of the small diameter portion is widened using the diameter widening jig, a plurality of types of diameter widening jig having an outer diameter increasing in diameter in steps can be used, and diameter widening can be performed in a plurality of stages while consecutively using a diameter widening jig having a small outer diameter and then a diameter widening jig having a large outer diameter, and finally enlarging the diameter of the small diameter portion to a target diameter. In claim 10, anything having an annular shape and an inner diameter larger than the outer diameter of the diameter widening jig can be used as the second receiving jig.

Next, claim 11 relates to an upper support. In the upper support of claim 9, the cylindrical inner piece conventionally provided as a separate body from the cup piece can be omitted, and therefore the weight of the upper support can be lightened and a reduction in costs can be realized.

The bottom portion of the base portion of the tubular portion in the cup piece is partially diameter widened in an axial direction, and a portion in the rubber elastic body corresponding to the bottom portion is pre-compressed. Therefore, the development of cracks in the rubber elastic body due to contraction stress from cooling after curing, and also due to repeated deformation during use, can be effectively inhibited, and durability of the rubber elastic body (that is, of the upper support) can be increased.

MODE FOR CARRYING OUT THE INVENTION

Figure 1:
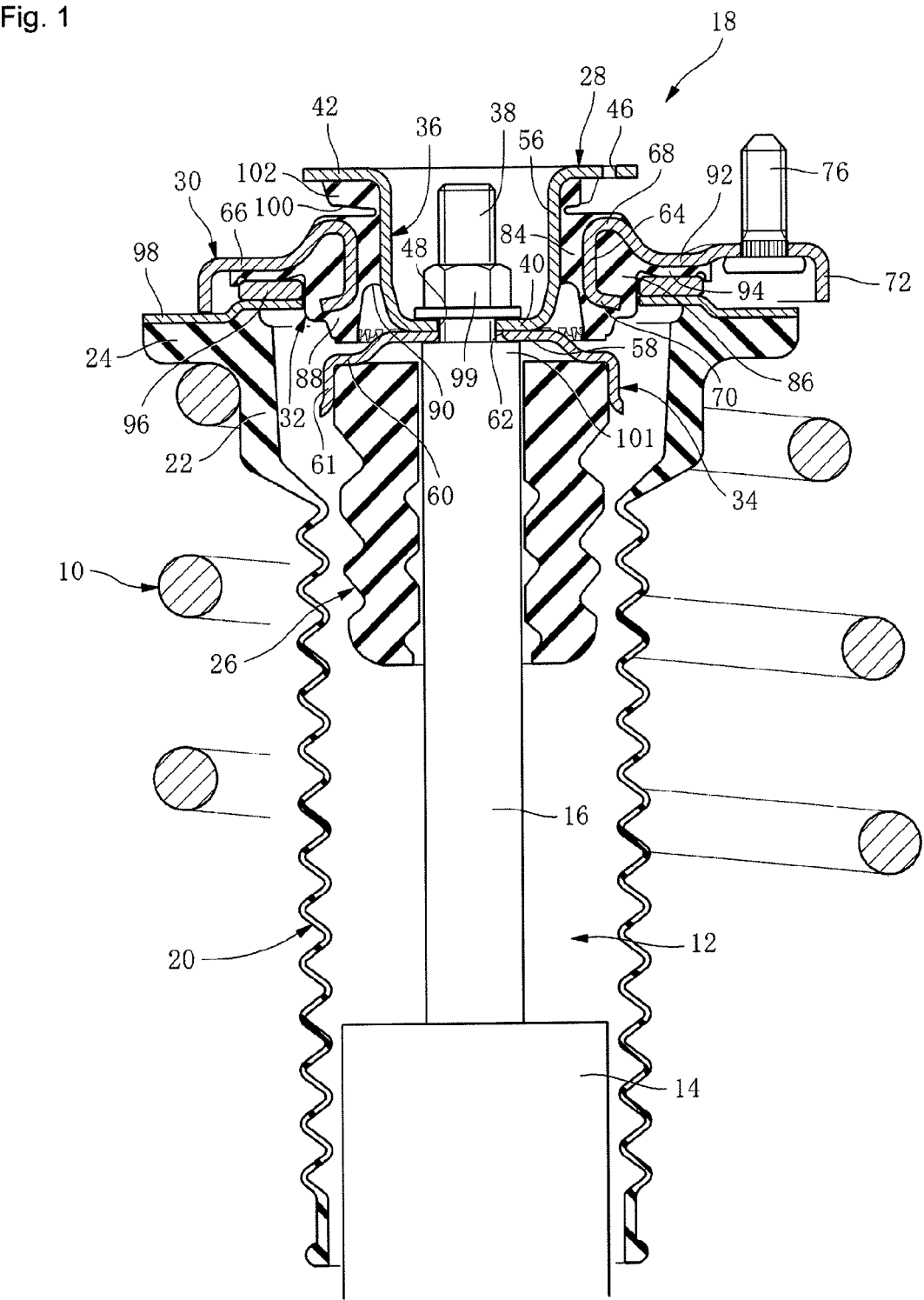
FIG. 1 illustrates an upper support of an embodiment of the present invention in a mounted state on a peripheral member of a vehicle.

Next, an embodiment of the present invention will be described in detail with reference to the drawings. In FIG. 1, 10 is a metallic coil spring providing a suspension element of a vehicle; 12 is a shock absorber likewise providing a suspension element, and includes a cylinder 14 and a piston rod 16 jutting upward therefrom. 18 is an upper support of the present embodiment, which elastically connects the piston rod 16 and a vehicle body panel not shown in the figure, and which acts to prevent vibration therebetween.

20 is a dust cover into which the shock absorber 12 is inserted at a position on an inner side of the coil spring 10, and which has a cylindrical and overall zig-zag shape configured with a rubber elastic body. The dust cover 20 includes, at an upper portion, a large diameter portion 22 having thick walls, and a thick-walled flanged portion 24 having an annular shape in a circumferential direction jutting in an outward radial direction from the top end of the large diameter portion 22.

26 is a bound stopper configured of an elastic body such as rubber, the upper portion thereof being held by the upper support 18. The bound stopper 26 restricts an excessively large contraction operation of the shock absorber 12 by abutting the bottom end of the bound stopper 26 on the cylinder 14.

Figure 2:
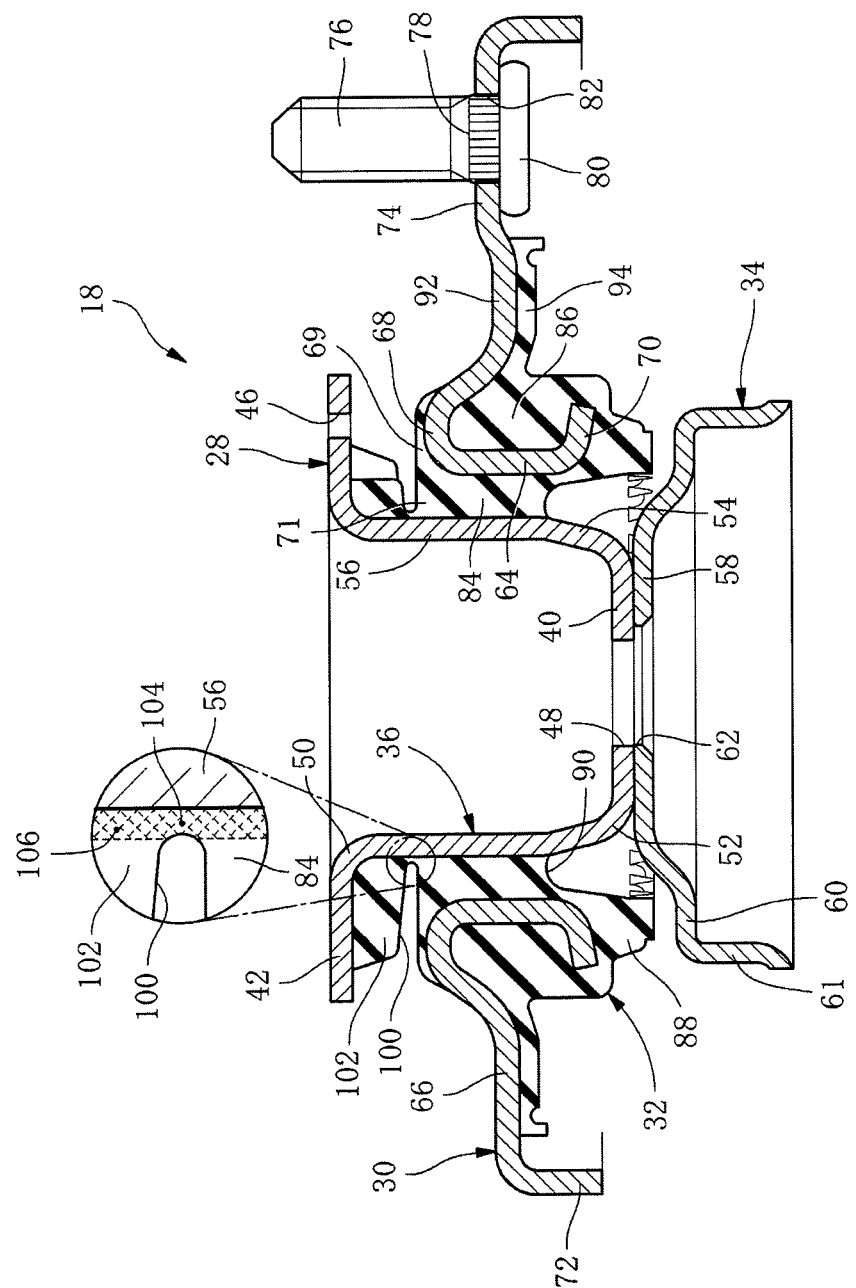
FIG. 2 is a cross-sectional view of the upper support of the embodiment.
Figure 3:
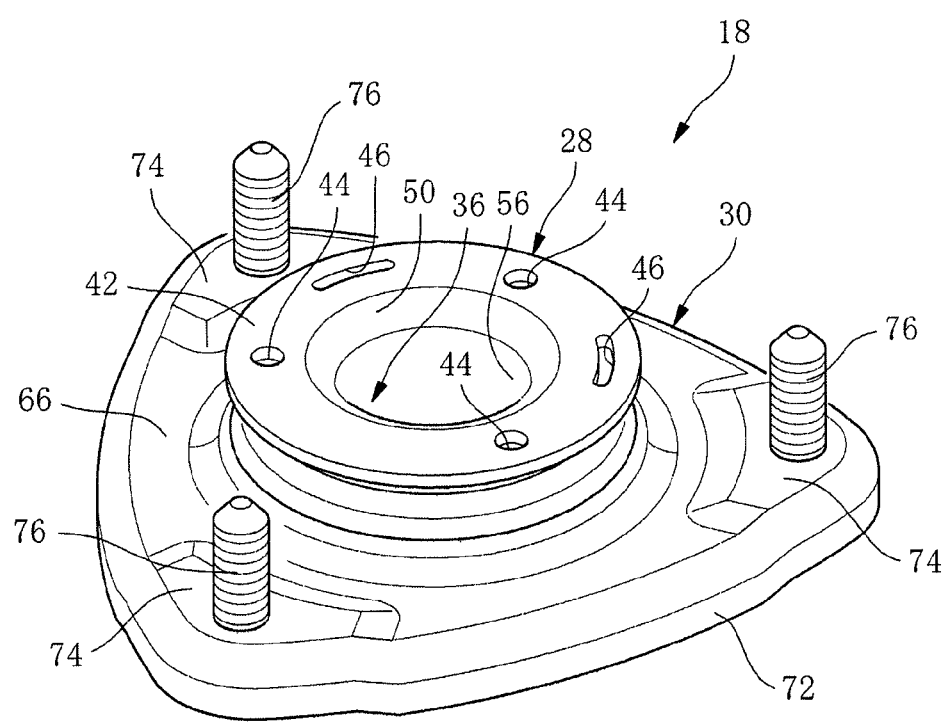
FIG. 3 is a perspective view of the upper support of FIG. 2.
Figure 4:
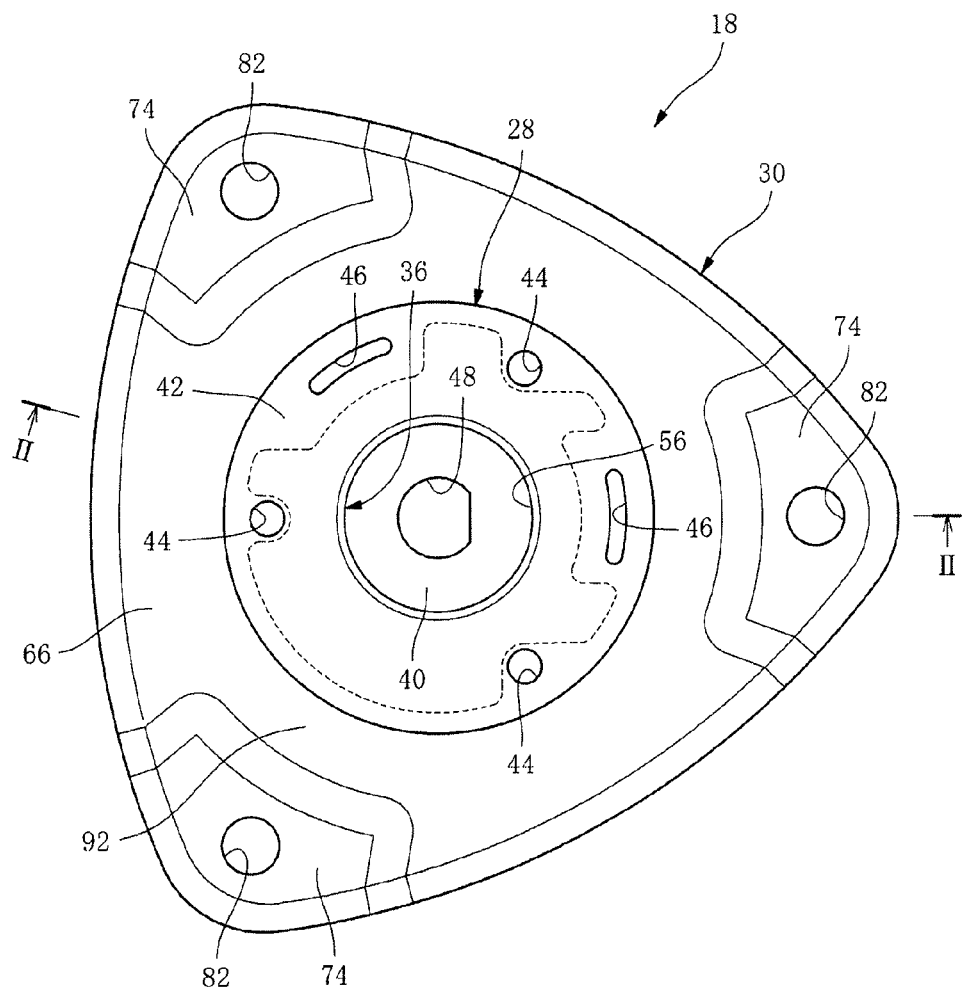
FIG. 4 is a plan view of the upper support of FIG. 2.

As shown in FIG. 2, the upper support 18 includes a top cup piece (cup piece) 28 as an inner piece, provided with an upward cup shape; an outer piece 30 disposed around the top cup piece 28 (more specifically, around a tubular portion 36 described hereafter) at a position offset in a radial direction; and a rubber elastic body 32 integrally vulcanize adhered to the top cup piece 28 and the outer piece 30, in a state elastically connecting the same. In the upper support 18, a bottom cup piece 34 having a reversed downward cup shape is further joined and fixed below the top cup piece 28.

The top cup piece 28 includes the cylindrical tubular portion 36, the base portion on the bottom end thereof (bottom base portion) 40, and a flanged portion 42 acting as a rebound stopper jutting in a radially outward direction at the top end on the opposite side from the base portion 40. Herein, the flanged portion 42 has a board shape and juts out in an axially orthogonal direction with respect to the axis direction of the top cup piece 28 (vertical direction in a vehicle-mounted state) and has an annular shape in a planar view. As shown in FIGS. 3 through 5A, the flanged portion 42 is provided with two kinds of through-holes for insertion 44 and 46, for the purpose of mounting to the vehicle. Herein, one of the holes, 44, is a hole with a round shape; the other hole, 46, is a long hole having an arced shape in a circumferential direction.

Meanwhile, the base portion 40 of the top cup piece 28 is provided with an insertion hole 48 at its center for inserting the piston rod 16 (specifically, for inserting a small diameter screw shaft 38 shown in FIG. 1). The top cup piece 28 has a curving portion 50 in which a portion from the flanged portion 42 to the top end of the tubular portion 36 curves in an arced shape, and a curving portion 52 in which a portion from the bottom end of the tubular portion 36 to the base portion 40 curves in the same arced shape.

Further, after diameter widening of the tubular portion 36 described hereafter (that is, the state illustrated in FIG. 2), the bottom end of the tubular portion 36 forms a tapered portion 54 whose diameter progressively decreases toward the bottom end. Further, the entirety of a portion above the tapered portion 54 forms a cylindrical portion 56 having a straight shape in the vertical direction (i.e., the axial direction) on the inner circumferential surface and the outer circumferential surface.

Meanwhile, the bottom cup piece 34 includes a base portion (upper base portion) 58, a bound stopper 60 having an annular shape in the circumferential direction at a position one step lower than the base portion 58, and a wall 61 having a cylindrical shape descending from the outer circumferential edge of the bound stopper 60.

The base portion 58 is provided with an insertion hole 62 at the center thereof through which the male screw shaft 38 of the piston rod 16 is inserted. In the bottom cup piece 34, the base portion 58 overlaps with the base portion 40 of the top cup piece 28 in a state where the insertion hole 62 is matched to the insertion hole 48 of the top cup piece 28. The base portion 58 is affixed to the base portion 40 in this state by welding.

Then, the top end of the bound stopper 26 is elastically fitted to the interior of the cylindrical wall 61 of the bottom cup piece 34 in a state fitted therein, such that the bound stopper 26 is held by the bottom cup piece 34.

The outer piece 30 includes an outer tubular portion 64 surrounding the entire circumference of the tubular portion 36 of the top cup piece 28 at a position offset in a radially outward direction and forming an outer tube with respect to the tubular portion 36, and a flanged portion 66 having an annular shape in the circumferential direction jutting in a radially outward direction from the top end thereof.

Herein, the outer tubular portion 64 has a straight shape in a vertical direction (i.e., an axial direction of the top cup piece 28) on the inner circumferential face and the outer circumferential face. The outer tubular portion 64 is buried within the rubber elastic body 32 along with a stopper abutment 68 on the rebound side described hereafter. In the outer piece 30, a portion running from the outer tubular portion 64 to the flanged portion 66 protrudes in a curved upward shape around the entire circumference in an upside-down U shape. The protrusion forms the stopper abutment 68 with respect to the flanged portion 42 which forms a rebound stopper.

The outer circumferential end of the flanged portion 66 is provided with a curve 72 descending around the entire circumference. Further, the flanged portion 66 is made to project in a radially outward direction in three places in the circumferential direction. The projections form board-shaped attachment portions 74. Each attachment portion 74 is formed with an anchor hole 82 for insertion of an attachment bolt 76, and the attachment bolt is locked thereto in an inserted state. A serrated portion 78 is provided to a large-diameter head portion 80 in the attachment bolt 76. The serrated portion 78 is locked to the anchor hole 82 in a state biting into an inner surface of the anchor hole 82.

The outer piece 30 is further provided with a curve jutting out in a radially outward direction around the entire circumference diagonally downward from the bottom end of the outer tubular portion 64 at a position vertically opposite the bound stopper 60 described above. The curve forms a stopper abutment 70 for the bound stopper 60.

By burying the outer tubular portion 64 of the outer piece 30 therein, the rubber elastic body 32 is divided into a main body rubber portion 84 and a cylindrical outer rubber portion 86 on an outer circumference of the outer tubular portion 64, the main body rubber portion 84 being configured with a cylindrical inner rubber portion sandwiched in a radial direction between the tubular portion 36 of the top cup piece 28 and the outer tubular portion 64. The rubber elastic body 32 includes a top rubber portion 71 on an upper side of the main body rubber portion 84 and continuous thereto. The top rubber portion 71 is provided with a coating rubber layer 69 coating an upper surface of the stopper abutment 68 on the rebound side described above.

Opposite the bound stopper 60, the rubber elastic body 32 is formed with an annular stopper rubber portion 88 projecting downward on the bound side in a state continuous with the main body rubber portion 84 and the outer rubber portion 86, and further in a state where an annular gap is formed with the tubular portion 36 of the top cup piece 28, on the bottom side of the main body rubber portion 84. In other words, the rubber elastic body 32 is provided with an upward scooped-out portion 90 from the bottom surface thereof. The rubber elastic body 32 forms a shape in which the main body rubber portion 84 is formed on an upper side of the scooped-out portion 90.

In the present embodiment, the top end of the upward scooped-out portion 90 is positioned equal to or slightly above the top end of the tapered portion 54 of the tubular portion 36 of the top cup piece 28.

One portion of the outer piece 30 forms an annular spring receptor 92 which receives the top end of the coil spring 10. Therebelow, a thin-walled rubber plate 94 is provided jutting in a radially outward direction continuous from the outer rubber portion 86 and in a state overlapping with the spring receptor 92. Herein, the rubber plate 94 is integrally vulcanize adhered to the spring receptor 92.

Then, as shown in FIG. 1, a resin plate- and annular-shaped bearing 96 is disposed therebelow and a metallic spring sheet 98 is disposed via the bearing 96. The reactive spring force from the coiled spring 10 is received by the spring receptor 92 of the outer piece 30 via the thick-walled flanged portion 24 of the dust cover 20, the spring sheet 98, the bearing 96, and then the rubber plate 94.

That is, in the upper support 18 of the present embodiment, the load of the vehicle body acts directly on the coil spring 10 via the outer piece 30, the bearing 96, the spring sheet 98, and the like, and the load is supported by the coil spring 10. Accordingly, in the upper support 18 of the present embodiment, the load of the vehicle body is added directly to the coil spring 10 from the outer piece 30, without passing through the main body rubber portion 84 in the rubber elastic body 32. The vehicle body load is thus effectively not added to the main body rubber portion 84.

Furthermore, as shown in FIG. 1, the screw shaft 38, which has a small diameter with respect to a main body portion of the piston rod 16, is inserted upward into the insertion holes 62 and 48, respectively, of the bottom cup piece 34 and the top cup piece 28. Thereafter, by screwing a nut 99 onto the screw shaft 38, the piston rod 16 is anchored to the top cup piece 28 and the bottom cup piece 34, respectively, in a state where the base portion 40 of the top cup piece 28 and the base portion 58 of the bottom cup piece 34 are sandwiched between a stepped portion 101 of the piston rod 16 and the nut 99.

Accordingly, the top cup piece 28 is integrally displaced with the piston rod 16 accompanying elastic deformation of the main body rubber portion 84. Based on elastic deformation of the main body rubber portion 84 at that time, vibration absorption and anti-vibration action are performed between the piston rod 16 and the vehicle body.

In the state of the manufactured article shown in FIG. 2, the rubber elastic body 32 of the upper support 18 (more specifically, the main body rubber portion 84 having a cylindrical shape) is imparted with pre-compression of 1.3 mm in a radial direction with respect to the shape during vulcanization molding. In the molding state, the thickness in the radial direction of the main body rubber portion 84 is 6.5 mm and, by pre-compressing that thickness by 1.3 mm in the radial direction, the degree of pre-compression is 20% herein.

Figure 5A:
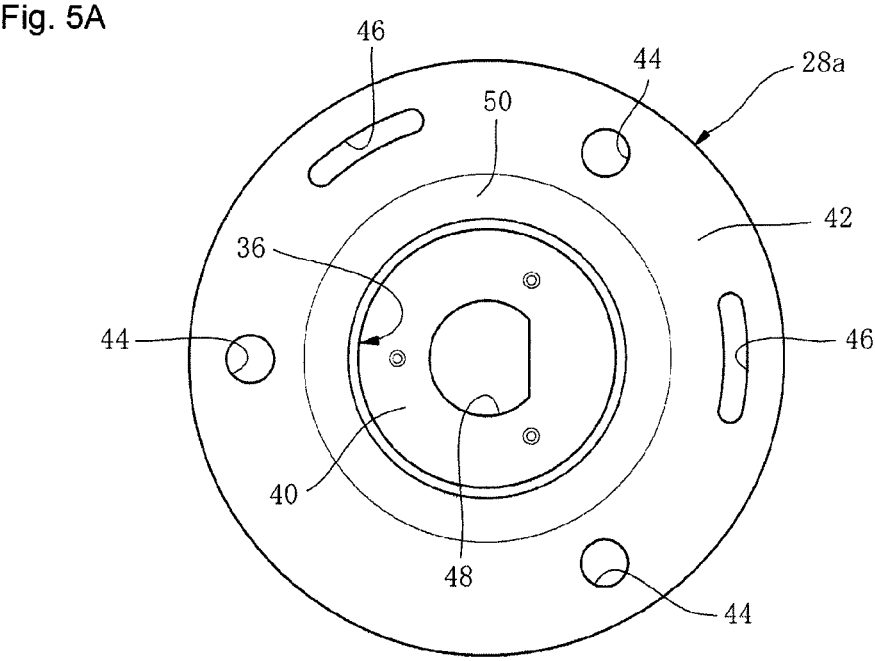
FIGS. 5A and 5B are solitary views illustrating the shape of a top cup piece before diameter widening in the upper support of FIG. 2.
Figure 5B:
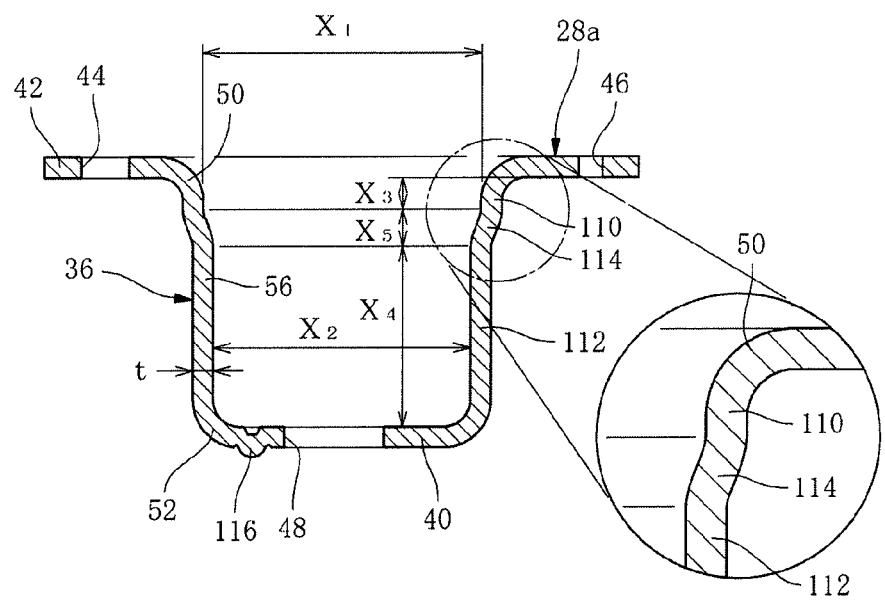

The rubber elastic body 32 is provided with a scooped-out portion 100 having an annular shape along a circumferential direction and oriented from the outer circumferential surface toward the tubular portion 36 at a position downward a predetermined distance from the flanged portion 42 in the top cup piece 28 (this position is the axial direction (vertical direction) position of the stepped portion of the tubular portion 36 before diameter widening, shown in FIGS. 5A and 5B).

Then, due to the scooped-out portion 100, the rubber elastic body 32 is vertically divided across the entire radial direction into the top rubber portion 71 on the main body rubber portion 84 side (more specifically, the main body rubber portion 84 and thereabove) and a stopper rubber portion 102 on the rebound side of the bottom surface of the flanged portion 42. However, the scooped-out portion 100 does not reach the tubular portion 36; instead, the scooped-out portion 100 enters deeply into the rubber elastic body 32 in a radially inward direction to a position leaving a thin rubber portion 104 (herein, the thickness of the thin rubber portion 104 in the radial direction is 0.5 mm) on an outer circumferential surface of the tubular portion 36. Accordingly, the main body rubber portion 84 and the stopper rubber portion 102 are meticulously divided vertically, leaving the thin rubber portion 104.

Herein, the thin rubber portion 104 belongs to a restrictive layer 106 (see the partial expanded view of FIG. 2) in which movement is restricted by an adhesive adhering a boundary surface between the tubular portion 36 of the top cup piece 28 and the rubber elastic body 32. Therefore, for example, even when the top cup piece 28 mutually displaces vertically with respect to the outer piece 30, the rubber of the thin rubber portion 104 is effectively inhibited from shifting to the main body rubber portion 84 side or to the stopper rubber portion 102 side. Alternatively, the rubber of the main body rubber portion 84 is effectively inhibited from shifting to the stopper rubber portion 102 side across the thin rubber portion 104, and the rubber of the stopper rubber portion 102 is effectively inhibited from shifting to the main body rubber portion 84 side across the thin rubber portion 104.

Figure 9A:
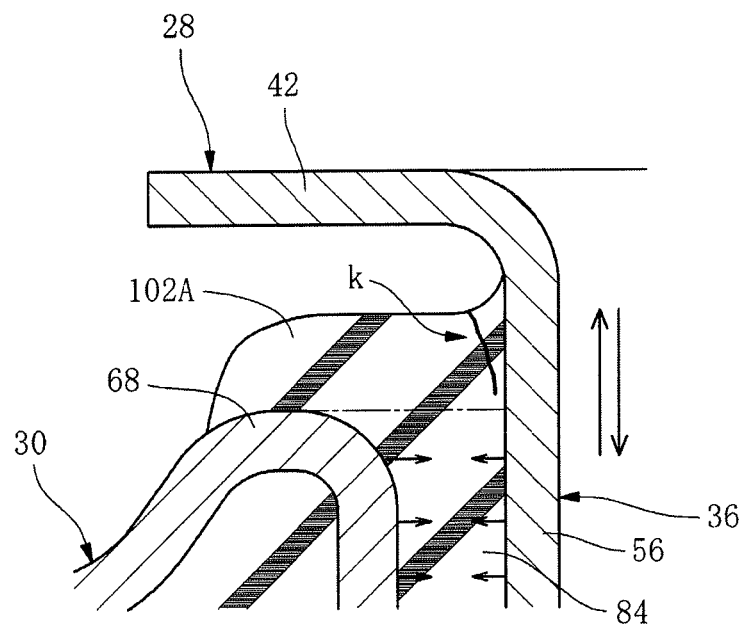
FIGS. 9A and 9B are comparative views illustrating comparative examples to describe an effect of the embodiment of the present invention.
Figure 9B:
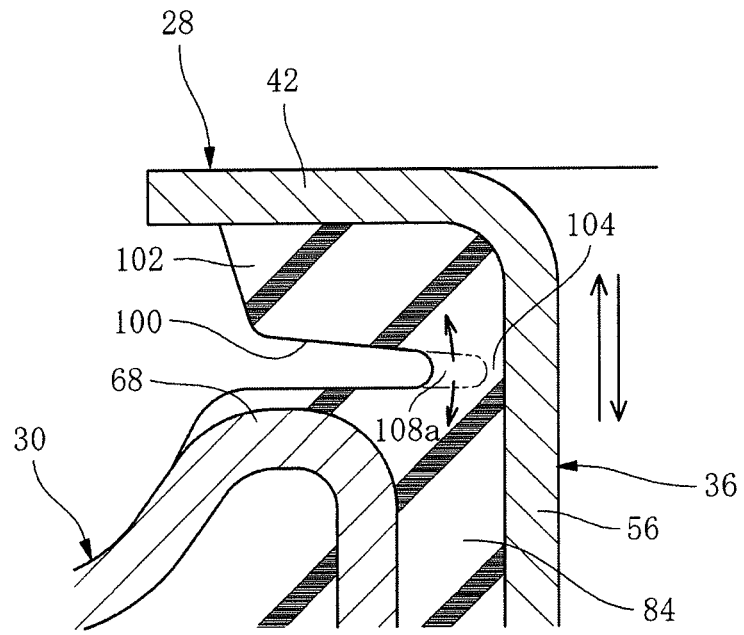

For example, as shown in FIG. 9B, when the scooped-out portion 100 is provided in a form that leaves a thick-walled rubber portion 108a having a comparatively thick wall on the tubular portion 36 side (that is, when the scooped-out depth of the scooped-out portion 100 is made shallow), there is a risk that the rubber of the thick-walled rubber portion 108a remaining on the tubular portion 36 side may shift to the main body rubber portion 84 side or to the stopper rubber portion 102 side accompanying mutual displacement of the top cup piece 28. Alternatively, the rubber of the main body rubber portion 84 side may shift to the stopper rubber portion 102 side across the thick-walled rubber portion 108a, or the rubber of the stopper rubber portion 102 may shift to the main body rubber portion 84 side across the thick-walled rubber portion 108a. Thereupon, there is a risk that a large localized warping or stress may develop at the thick-walled rubber portion 108a and that cracks will develop therefrom. However, in the present embodiment, only the thin rubber portion 104 having a thin wall remains on the tubular portion 36 side. Therefore, warping and the development of cracks described above due to shifting of the rubber may be effectively inhibited. Further, the scooped-out portion 100 described above has a cross-sectional shape in which the vertical width in the drawing grows smaller proceeding from the outer circumferential surface in a radially inward direction.

The stopper rubber portion 102 on the rebound side contacts the stopper abutment 68 during a rebound stopping action and works with the flanged portion 42 acting as the rebound stopper to produce displacement control in the rebound direction. The stopper rubber portion 102 is formed overall in a comparatively thick-walled board shape and in an annular shape around the tubular portion 36, and is integrally vulcanize adhered to the top cup piece 28. However, the stopper rubber portion 102 on the rebound side is made to plunge in a radially inward direction locally around the holes 46 and 44 of the flanged portion 42 to avoid interference with jigs for attachment to the vehicle body inserted and engaged with the holes 46 and 44.

Next, the manufacturing method of the present embodiment manufacturing the upper support shown in FIG. 2 is described hereafter. 28a in FIGS. 5A and 5B shows a top cup piece before diameter widening. As shown, here, before diameter widening (that is, before integral vulcanized adhesion to the rubber elastic body 32), the shape of the top cup piece 28a, and more specifically the shape of the tubular body 36, has a large diameter portion 110 at a top portion continuous with the flanged portion 42, a small diameter portion 112 at a bottom portion on the base portion 40 side, and a stepped portion 114 at a portion between the large diameter portion 110 and the small diameter portion 112.

Herein, the small diameter portion 112 has a straight shape in an axial direction of the top cup piece 28a on both the inner circumferential surface and the outer circumferential surface. Similarly, the large diameter portion 110 (strictly speaking, the lower portion of the curved portion 50) also has a straight shape in an axial direction on the inner circumferential surface and the outer circumferential surface. Moreover, the stepped portion 114 has a reverse tapered shape from the large diameter portion 110 to the small diameter portion 112.

An inner diameter $X_1$ of the large diameter portion 110, herein, is set to the inner diameter of the dimensions obtained as dimensions for the tubular portion 36 after diameter widening. In the present embodiment, the dimension $X_1$=35.4 mm. Meanwhile, an inner diameter $X_2$ of the small diameter portion is 32.8 mm. Thus, the difference between $X_1$ and $X_2$ is $X_1-X_2$=2.6 mm, and thus the difference in dimension between the large diameter portion 110 and the small diameter portion 112 is 1.3 mm on one side in the radial direction. In addition, a thickness t=2.6 mm, and the respective dimensions $X_3$, $X_4$, $X_5$ for each of the large diameter portion 110, the small diameter portion 112, and the stepped portion 114 in the axial direction (vertical direction) thereof are $X_3$=4.3 mm, $X_4$=22.7 mm, and $X_5$=4.5 mm.

Furthermore, in FIG. 5B, 116 is a projection provided to the base portion 40 of the top cup piece 28a for projection welding of the bottom cup piece 34. In the manufacturing method of the present embodiment, the top cup piece 28a shown in FIGS. 5A and 5B is used as the inner piece, and the top cup piece 28a and the outer piece 30 are integrally vulcanize adhered to the rubber elastic body 32 during molding of the rubber elastic body 32. Also, thereafter, diameter widening is performed on the small diameter portion 112 of the top cup piece 28a to impart pre-compression to the rubber elastic body 32 (specifically, the main body rubber portion 84).

Figure 6:
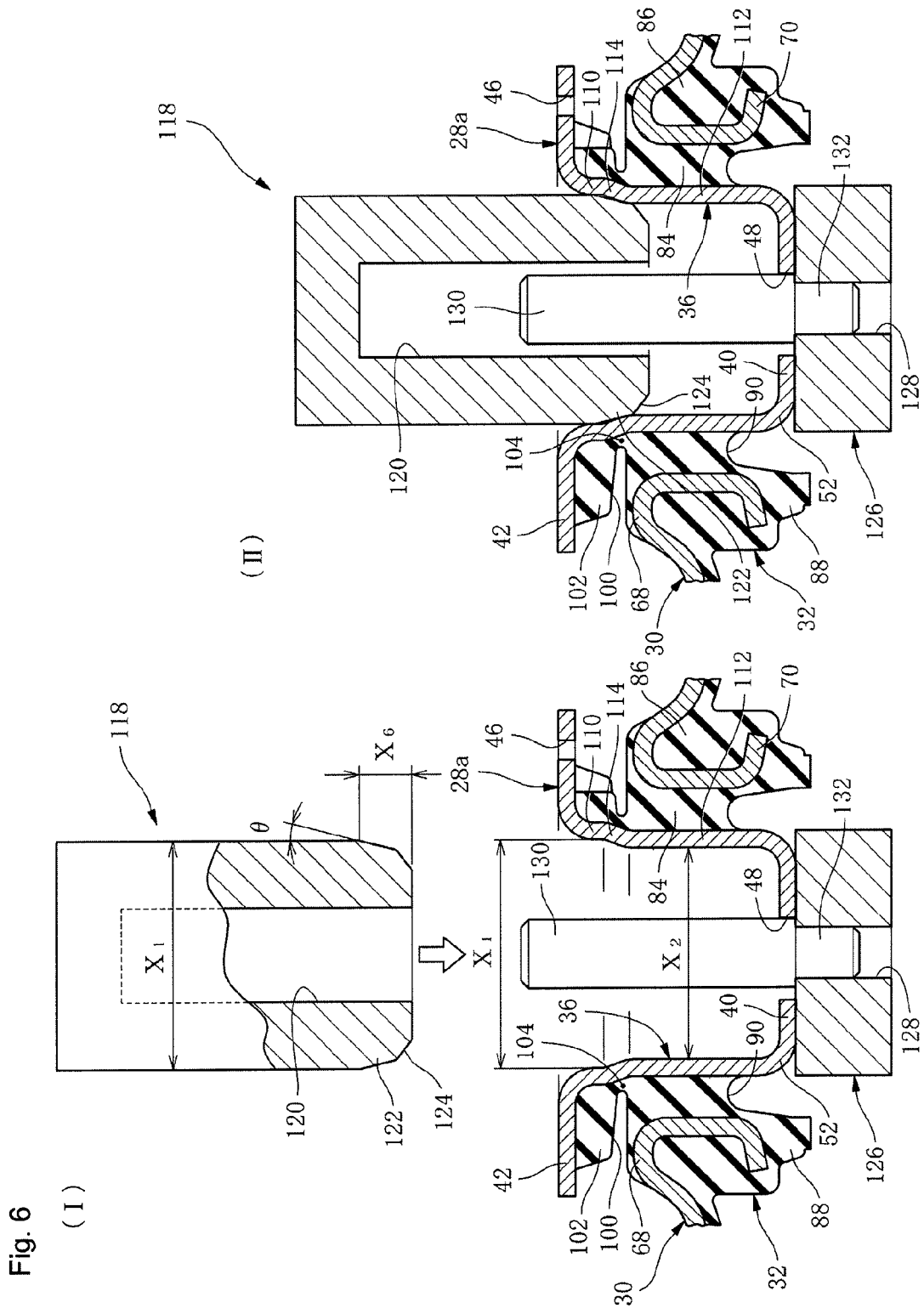
FIG. 6 is an explanatory view of a process of diameter widening on the top cup piece shown in FIG. 5.
Figure 7A:
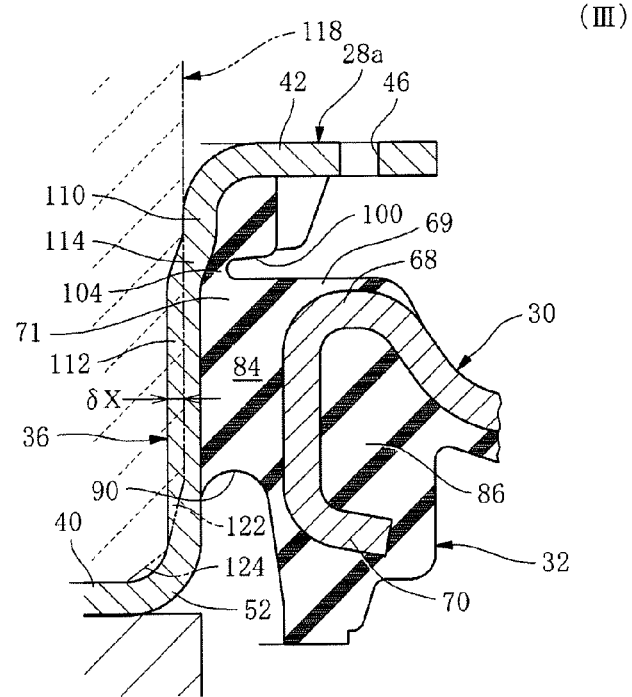
FIGS. 7A and 7B are explanatory views continuing from FIG. 6.
Figure 7B:
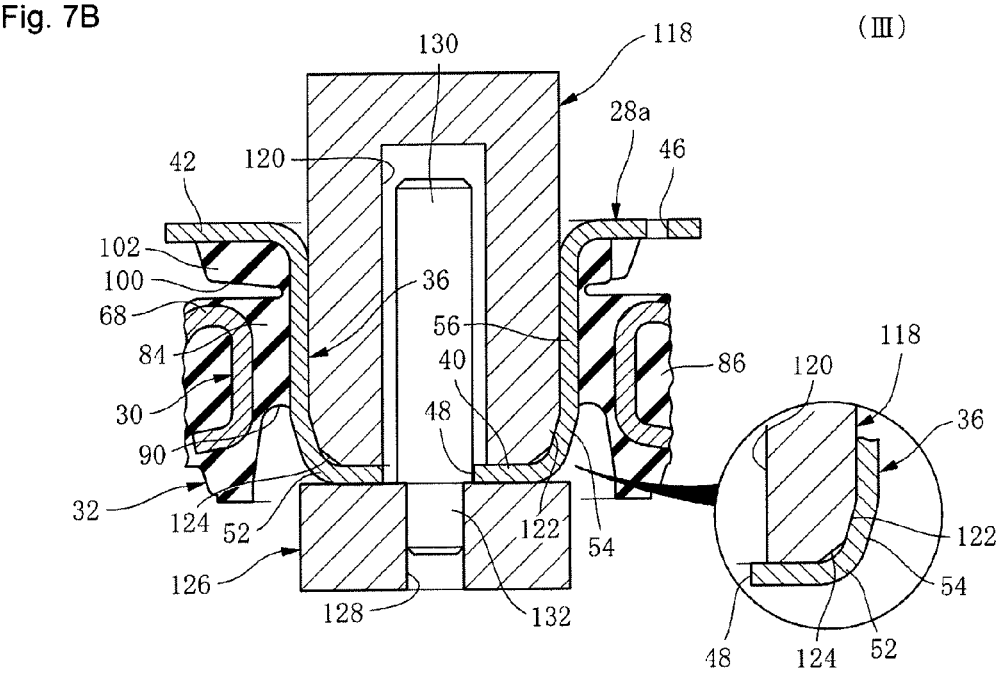
Figure 8:
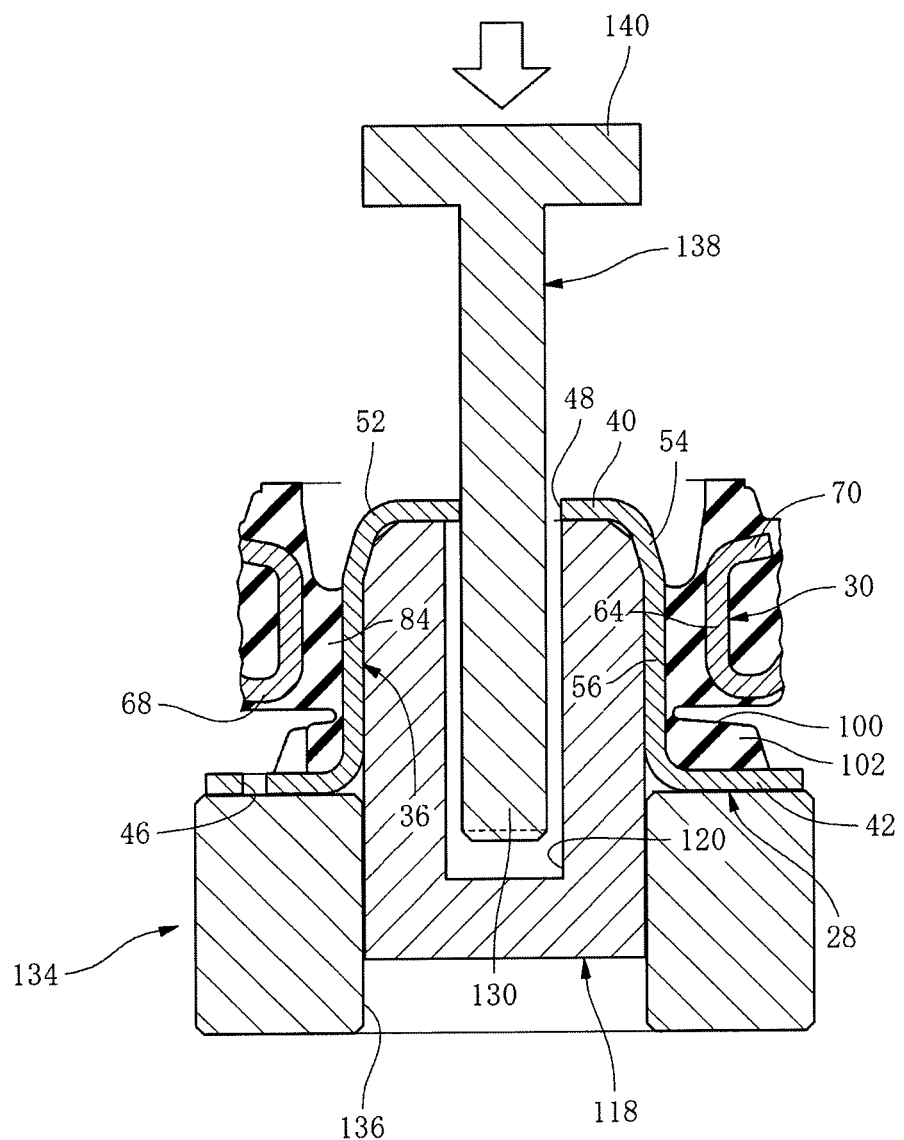
FIG. 8 is an explanatory view continuing from FIGS. 7A and 7B.

In FIGS. 6 through 8, a process of diameter widening at such a time for the tubular portion 36 is concretely illustrated. In FIG. 6 (I), 118 is a diameter widening jig for widening the diameter of the tubular portion 36 (specifically, the small diameter portion 112) of the top cup piece 28a. The diameter widening jig 118 has an overall columnar shape. Herein, the outer diameter of the diameter widening jig 118 is the inner diameter $X_1$, the same as the inner diameter of the large diameter portion 110. The diameter widening jig 118 is provided with a hole 120 open at the flat bottom end surface in the center thereof, and extending upward therefrom.

A tapered portion 122 whose diameter gradually decreases toward the bottom end (front end) is formed on the outer circumference of the bottom end (front end). Furthermore, a chamfer 124 is further formed across a minute range on the bottom end continuous with the tapered portion 122. A height $X_6$ of the tapered portion 122 is 8 mm, and the height $X_6$ of the tapered portion 122 is effectively the same height as the tapered portion 54 of the top cup piece 28 shown in FIG. 2. An angle of inclination θ of the tapered portion 122 herein is θ=15°. The height $X_6$ of the tapered portion 122 is preferably within a range of 3 to 10 mm, and the angle θ of the tapered portion 122 is preferably within a range of >0° to 15°.

126 is a receiving jig receiving the top cup piece 28a when the top cup piece 28a is to be diameter widened. The receiving jig 126 has a cylindrical shape in a plan view and includes an insertion through-hole 128 at the center thereof. 130 is a guide pin attached to the receiving jig 126 in a state where the guide pin 130 projects upward from the receiving jig 126. The guide pin 130 includes a small diameter insertion portion 132 on the bottom end thereof. By inserting the insertion portion 132 into the insertion hole 128, the guide pin 130 is mounted to the receiving jig 126.

FIG. 6 (I) illustrates a state in which an integrally vulcanized article where the top cup piece 28a serves as an inner piece is set in a state where the base portion 40 of the top cup piece 28a is received and supported from below by the receiving jig 126, and further, where the guide pin 130 protrudes upward by insertion through the insertion hole 48 of the base portion 40.

In the manufacturing method of the present embodiment, in such a state, the diameter widening jig 118 is inserted downward into the tubular portion 36 of the integrally vulcanized article (see FIG. 6 (II)), then the diameter widening jig 118 is pushed downward and press-fitted therein, thereby widening the diameter of the small diameter portion 112 with the diameter widening jig 118. Specifically, the diameter of the small diameter portion 112 is deformed to be widened (at this point, the stepped portion 114 is diameter widened a certain amount as the small diameter portion 112 is widened). FIG. 7B illustrates a state in which the diameter widening jig 118 is press-fitted fully within the tubular portion 36 in this way to widen the diameter of the small diameter portion 112.

Through the diameter widening, the diameter of the small diameter portion 112 is deformed to widen by only δX (δX=1.3 mm), shown in FIG. 7A (III), and the main body rubber portion 84 is pre-compressed by the same dimensions accordingly. In the present embodiment, the degree of compression in the pre-compression is 20%, as described above. Herein, the degree of compression in the pre-compression is given as (δX/A)×100(%) when A is the radial direction thickness of the main body rubber portion 84 prior to diameter widening. In diameter widening, the diameter of the small diameter portion 112 is deformed to widen at the bottom end thereof by the tapered portion 122, also. However, the degree of deformation of the diameter widening is smaller than for a portion in the small diameter portion 112 corresponding to the main body rubber portion 84.

The top end position of the tapered portion 122 of the diameter widening jig 118 is a position equal to or lower than the position of the bottom end of the main body rubber portion 84 (that is, the top end of the upward scooped-out portion 90) in a state where the diameter widening jig 118 is completely press-fitted therein. Accordingly, even when such a tapered portion 122 is provided to the diameter widening jig 118, the main body rubber portion 84 is adequately pre-compressed at a planned degree of compression across the entire length of the axial direction.

When diameter widening is performed as above by press-fitting the diameter widening jig 118 into the tubular portion 36 of the top cup piece 28, the receiving jig 126 is next removed from the diameter-widened article along with the guide pin 130. As shown in FIG. 8, the diameter-widened article is then vertically reversed and the flanged portion 42 of the top cup piece 28 is received from below by a second receiving jig 134 to be in a supported state.

Moreover, the second receiving jig 134 also has an annular shape, and includes an extraction hole 136 in the center thereof. The diameter widening jig 118, in a fixed state press-fitted into the tubular portion 36 and held therein, is fitted into the extraction hole 136. That is, the receiving jig 134 receives and holds the flanged portion 42 of the top cup piece 28 from below, around the diameter widening jig 118. 138 is an extraction pin and includes a press-fitting portion 140 on an upper end thereof in the drawing.

FIG. 8 illustrates a process for removing the diameter widening jig 118 and, herein, as shown in the same figure, in a state where the flanged portion 42 of the top cup piece 28 is held by the receiving jig 134, the extraction pin 138 is inserted downward in the drawing through the insertion hole 48 of the base portion 40. The extraction pin 138 is then further pushed in downward, and the diameter widening jig 118 which is in a fixed state with the top cup piece 28 is removed downward through the extraction hole 136 of the receiving jig 134. The diameter widening jig 118 is thus separated from the top cup piece 28. Furthermore, herein, the small diameter portion 112 is diameter widened to a final widened diameter dimension by diameter widening which press-fits the diameter widening jig 118 therein once. However, the diameter widening operation may be broken into multiple steps and the small diameter portion 112 may be gradually and consecutively diameter widened to achieve a final widened diameter dimension. When diameter widening has been performed on the top cup piece 28a as above and pre-compression has been imparted to the main body rubber portion 84, next the bottom cup piece 34 is welded to the top cup piece 28. The upper support 18 shown in FIG. 2 is obtained thereby.

As above, in the manufacturing method of the present embodiment, a cylindrical inner piece conventionally necessitated as a separate body from the top cup piece 28 may be omitted, thus enabling the upper support 18 to be made lightweight and enabling a reduction in costs. Additionally, when pre-compression is imparted to the rubber elastic body 32 by diameter widening the tubular portion 36 of the top cup piece 28a, diameter widening is performed only on the small diameter portion 112 and is not performed on the large diameter portion 110 on the upper portion of the tubular portion 36 continuous with the flanged portion 42. Thus, deformation is not generated therein. Accordingly, upward roll-back deformation of the flanged portion 42 of the top cup piece 28a due to diameter widening can be prevented. Therefore, a process to correct the shape of the flanged portion 42 following diameter widening on the top cup piece 28*a* can be made unnecessary, and thus the issue of variation developing in the reformative process can be eliminated. In addition, deformation caused by deformation of the flanged portion 42 can also be prevented for the holes 44 and 46 provided to the flanged portion 42 for mounting to the vehicle.

In the present embodiment, the rubber elastic body 32 is provided with the scooped-out portion 100 at an axial direction position where the stepped portion 114 is positioned. The scooped-out portion 100 has an annular shape along the circumferential direction and is oriented in a radially inward direction from the outer circumferential surface toward the stepped portion 114. The rubber elastic body 32 is vertically divided by the scooped-out portion 100 in an axial direction across the entire radial direction into the main body rubber portion 84 side and the stopper rubber portion 102 on the rebound side on the bottom face of the flanged portion 42. Therefore, in a form where the tubular portion 36 of the top cup piece 28 (serving as the inner piece) and the outer tubular portion 64 of the outer piece 30 are connected in a radial direction, the occurrence of a rubber portion where pre-compression has not been imparted can be effectively prevented on an outer circumferential side of the portion where the stepped portion 114 is positioned. The development of cracks at the portion where pre-compression has not been imparted can thus be effectively inhibited.

Meanwhile, in the present embodiment, the main body rubber portion 84 side and the stopper rubber portion 102 side are linked by the thin rubber portion 104. Thus, during molding of the rubber elastic body 32, the main body rubber portion 84 and the stopper rubber portion 102 can be favorably molded at the same time.

In the present embodiment, the diameter widening jig 118 is provided with the outer circumferential surface on the front end as the tapered portion 122. Accordingly, when the tubular portion 36 is diameter widened by the diameter widening jig 118, the development of cracks in a portion from the bottom end of the base portion 40 side to the base portion 40 can be effectively prevented. Further, by providing such a tapered portion 122 to the diameter widening jig 118, diameter widening can be performed on the small diameter portion 112 by smoothly press-fitting the diameter widening jig 118 in an axial direction into the tubular portion 36.

Further, in the diameter widening process for the tubular portion 36 (specifically, the small diameter portion 112) of the top cup piece 28*a* in the manufacturing method of the present embodiment, diameter widening can be smoothly and favorably performed. Moreover, the diameter widening jig 118 can be favorably removed from the top cup piece 28 in a state where the diameter widening jig 118 is press-fitted and fixed therein.

Figure 10A:
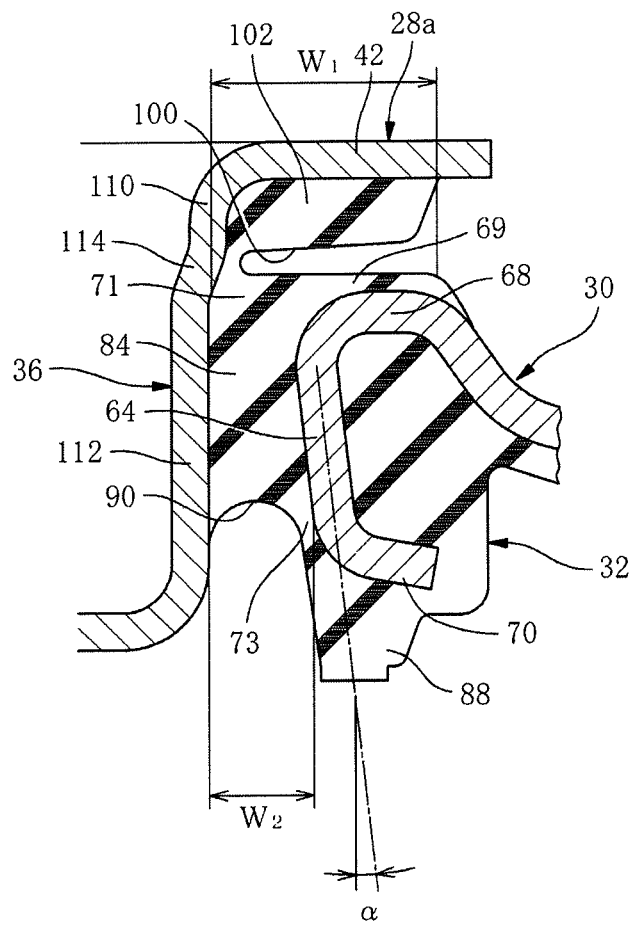
FIGS. 10A and 10B illustrate a main portion of another embodiment of the present invention.
Figure 10B:
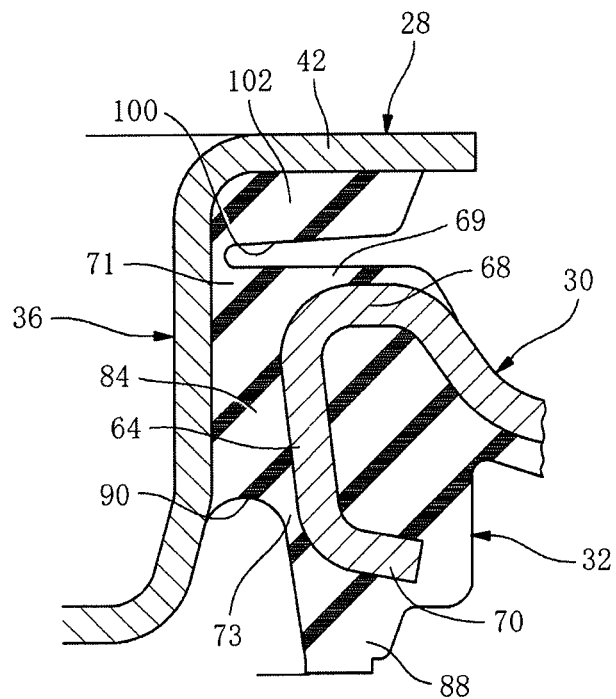

Next, another embodiment of the present invention is shown in FIGS. 10A and 10B. In this example, the outer tubular portion 64 of the outer piece 30 (both the inner circumferential surface and the outer circumferential surface) have an inclined shape widening downward and inclined at an angle $\alpha$, and having a shape in which the gap with the tubular portion 36 of the top cup piece 28 widens as it progresses downward (thus, the outer tubular portion 64 is inclined with respect to the tubular portion 36 of the top cup piece 28*a*, as well, prior to diameter widening).

As shown in FIGS. 11A to 11D, in the case of the above-described embodiment in which the outer tubular portion 64 has a straight shape in an axial direction of the top cup piece 28, by diameter widening the small diameter portion 112, a force works attempting to lift the top cup piece 28 slightly upward in the drawing. Therefore, there is a possibility that a mutual position in the axial direction of the top cup piece 28 with respect to the outer piece 30 will shift upward in the drawing. This is due to the following reason.

The rubber elastic body 32 includes the top rubber portion 71 on an upper side of the main body rubber portion 84 and continuous thereto. The top rubber portion 71 is provided with the coating rubber layer 69 coating the upper surface of the stopper abutment 68. The top rubber portion 71 is compressed a certain degree by diameter widening of the small diameter portion 112. However, the degree of compression is weak compared to the main body rubber portion 84. Thus, when the small diameter portion 112 is diameter widened, the rubber of the main body rubber portion 84 which is strongly compressed attempts to escape toward the top rubber portion 71 for which compression is weak. Furthermore, in the coating rubber layer 69 of the top rubber portion 71, a rubber width $W_1$ is large, and the coating rubber layer 69 has a shape facilitating the escape of the rubber.

In comparison, the lower side of the main body rubber portion 84 is formed with the upward scooped-out portion 90. No rubber portion exists therein. A rubber portion only exists in a shifting portion 73 shifting slightly toward the stopper rubber portion 88 on the bound side from the main body rubber portion 84. Accordingly, the rubber of the main body rubber portion 84 is unlikely to escape any further downward.

Figure 11A:
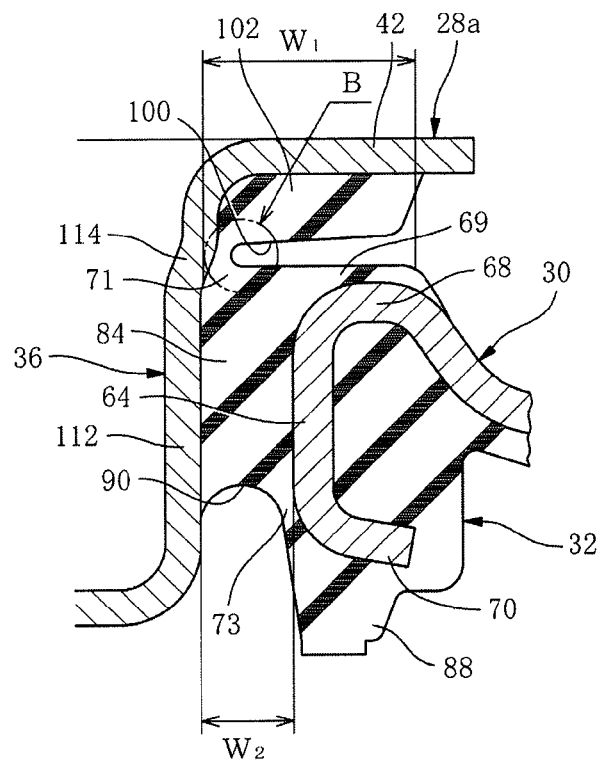
FIGS. 11A through 11D are comparative explanatory views to describe advantages of the embodiment of FIGS. 10A and 10B.
Figure 11B:
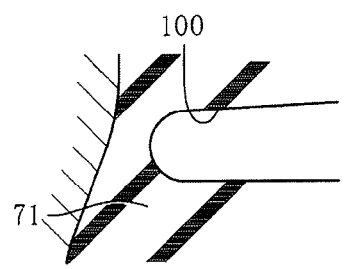
Figure 11C:
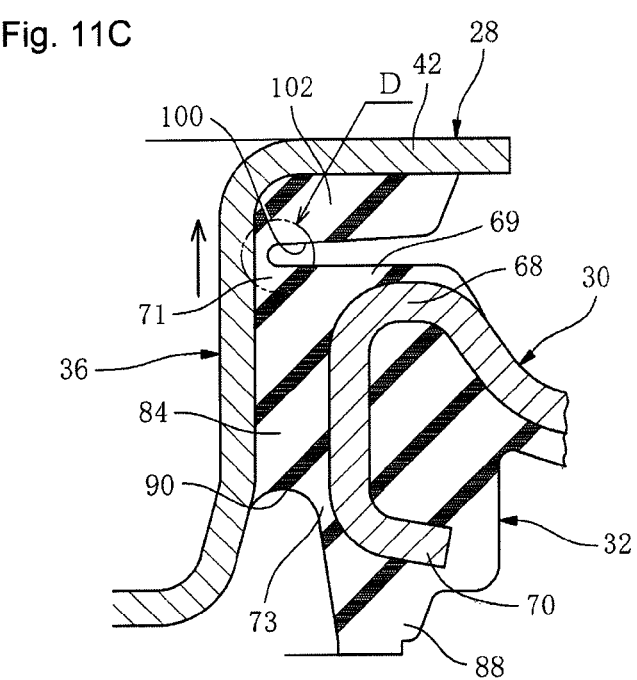
Figure 11D:
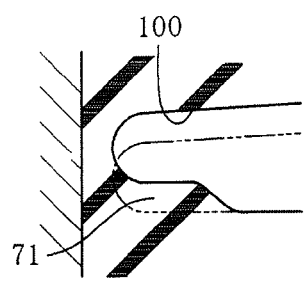
Figure 12:
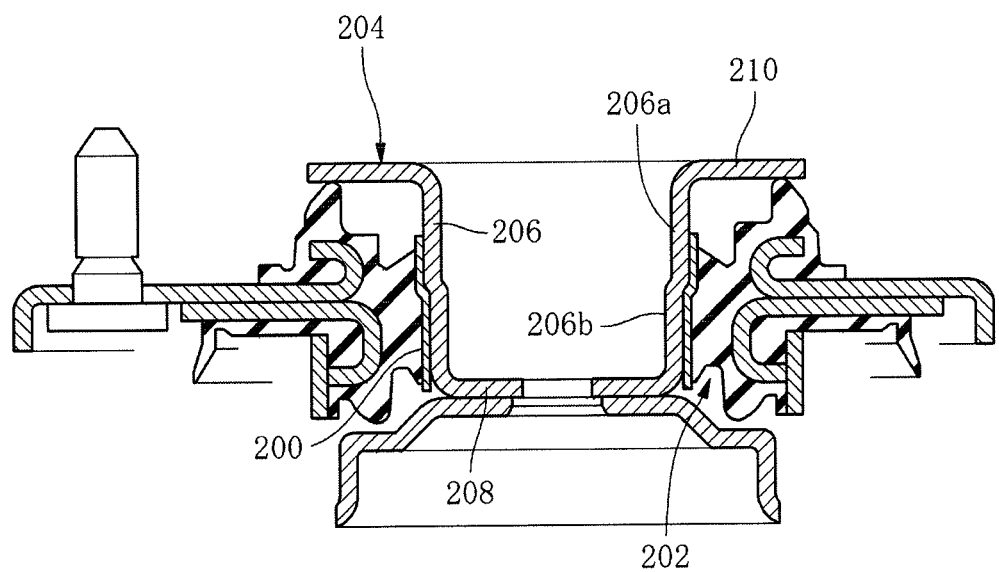
FIG. 12 illustrates an example of a conventional upper support.
Figure 13:
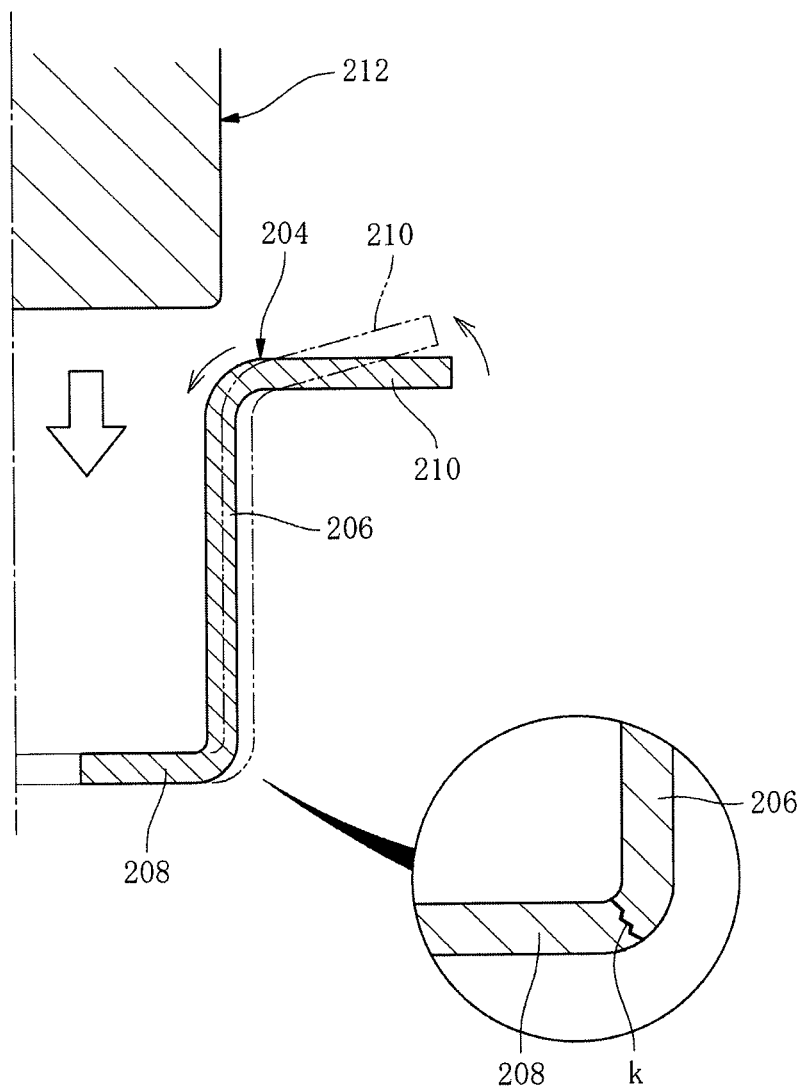
FIG. 13 is an explanatory view illustrating a negative situation which arises due to diameter widening of the cup piece in the upper support.

As a result, by the rubber of the main body rubber portion 84 attempting to escape upward due to diameter widening, an upward force acts on the top cup piece 28 and there is a possibility that the top cup piece 28 may shift an axial direction mutual position upward in the drawing with respect to the outer piece 30. Moreover, when the top cup piece 28 shifts the axial direction mutual position upward with respect to the outer piece 30, as shown in FIG. 11D, there is a risk that a portion in the vicinity of an inner edge of the radially inward scooped-out portion 100 may be pulled, and that tensile deformation may develop there.

To address this, in the embodiment shown in FIGS. 10A and 10B, the outer tubular portion 64 of the outer piece 30 has an inclined shape widening downward. Therefore, when the small diameter portion 112 is diameter widened, due to an effect of the inclined shape of the outer tubular portion 64, a force develops pushing it downward with respect to the main body rubber portion 84.

Additionally, due to the outer tubular portion 64 having an inclined shape, a rubber width $W_2$ on a bottom end of the main body rubber portion 84 widens, and the rubber width of the portion 73 shifting from the main body rubber portion 84 to the stopper rubber portion 88 is also widened. Therefore, the rubber of the main body rubber portion 84 becomes likely to escape toward the stopper rubber portion 88 therethrough.

As a result, in the present embodiment, during diameter widening of the small diameter portion 112, the force of the rubber of the main body rubber portion 84 attempting to escape upward and the force of the rubber of the main body rubber portion 84 attempting to escape downward are balanced. As a result, the force pressing the top cup piece 28 upward in the drawing is effectively reduced or eliminated. Thus, in the embodiment shown in FIGS. 10A and 10B, the development of tensile deformation of the rubber based on positional shifting in an axial direction of the top cup piece 28 can be eliminated or eased. Further, when the angle of inclination $\alpha$ of the outer tubular portion 64 is larger than necessary, there is a risk that the pre-compression of the bottom portion of the main body rubber portion 84 may be inadequate, and thus the angle $\alpha$ is appropriately defined in consideration thereof.

Embodiments of the present invention have been described in detail above; however, these are merely examples. For example, in an example above, due to diameter widening of the small diameter portion 112, the inner circumferential surface thereof has a straight shape in an axial direction (vertical direction). However, in certain cases, according to various shapes or the like of the main body rubber portion 84, there is a possibility that the shape of the inner circumferential surface may have a shape other than straight. In other cases, there is a possibility that the small diameter portion 112 may be diameter widened in a shape where a slight stepped portion remains on the tubular portion 36. Further, in the process of diameter widening shown in FIGS. 6 through 7B, an object having the hole 120 in the center thereof is used as the diameter widening jig. However, an object not having such a hole 120 may also be used to perform diameter widening. The present invention may additionally be applied to an upper support of a form where a vehicle body load passes through the main body rubber portion to the coil spring. The present invention may also be embodied in a form or configuration including various modifications without violating the scope of the description of the present invention.

DESCRIPTION OF REFERENCE NUMERALS

12 Shock absorber
16 Piston rod
18 Upper support
28, 28a Top cup piece
30 Outer piece
32 Rubber elastic body
39 Tubular portion
40 Base portion
42 Flanged portion
48 Insertion hole
64 Outer tubular portion
68, 70 Stopper abutment
84 Main body rubber portion
90, 100 Scooped-out portion
102 Stopper rubber portion
104 Thin rubber portion
110 Large diameter portion
112 Small diameter portion
114 Stepped portion
118 Diameter widening jig
120 Hole
122 Tapered portion
126 Receiving jig
130 Guide pin
134 Second receiving jig
138 Release pin

The invention claimed is:

1. A manufacturing method for an upper support wherein:
the upper support comprises (a) a cup piece forming an inner piece, (b) an outer piece disposed around the inner piece in a position offset in a radial direction, and (c) a rubber elastic body integrally vulcanize adhered to the inner piece and the outer piece in a state where the inner piece and the outer piece are elastically connected to the rubber elastic body; and
the upper support is anchored to a piston rod for a shock absorber on an inner piece side, and the upper support is anchored to a vehicle body on an outer piece side, the upper support elastically connecting the piston rod and the vehicle body and acting to prevent vibration;
the manufacturing method for the upper support comprising:
integrally vulcanize adhering the cup piece directly to the rubber elastic body, the cup piece including:
a tubular portion;
a base portion having a piston rod insertion hole in a center of a bottom end of the tubular portion; and
a flanged portion jutting in a radially outward direction at a top end of the tubular portion on a side opposite to the base portion,
providing the cup piece such that the shape of the tubular portion prior to integral vulcanized adhesion with the rubber elastic body is a shape comprising:
an upper portion continuous with the flanged portion as a large diameter portion;
a lower portion on the base portion as a small diameter portion; and
a portion between the large diameter portion and the small diameter portion as a stepped portion,
and
following the integral vulcanized adhesion with the rubber elastic body, diameter widening the small diameter portion by press-fitting a diameter widening jig into the small diameter portion to impart pre-compression to a portion of the rubber elastic body corresponding to the small diameter portion while diameter widening is not performed on the large diameter portion, which retains its dimensions and shape.

2. The manufacturing method for the upper support according to claim 1, wherein the diameter of the small diameter portion is widened until the inner diameter of an upper end of the small diameter portion becomes the same inner diameter as the inner diameter of the large diameter portion and the stepped portion is eliminated.

3. The manufacturing method for the upper support according to claim 2, wherein an inner circumferential surface of the large diameter portion and an inner circumferential surface of the small diameter portion up to the bottom end of the portion where pre-compression is imparted to the rubber elastic body are made to have a continuous, straight shape in the axial direction by the diameter widening of the small diameter portion.

4. The manufacturing method for the upper support according to claim 1, wherein:
the outer piece includes an outer tubular portion having a shape surrounding the tubular portion of the cup piece at a position offset in a radially outward direction;
the rubber elastic body has a tubular main body rubber portion sandwiched between the tubular portion of the cup piece and the outer tubular portion in a radial direction; and
pre-compression is imparted to the main body rubber portion by the diameter widening of the small diameter portion.

5. The manufacturing method for the upper support according to claim 4, wherein the rubber elastic body includes a scooped-out portion at an axial direction position where the stepped portion is positioned prior to the diameter widening, the scooped-out portion having an annular shape along a circumferential direction and oriented in a radially inward direction from the outer circumferential surface toward the stepped portion,
the rubber elastic body being vertically divided by the scooped-out portion in an axial direction across the entire radial direction such that the main body rubber portion to which pre-compression is imparted by the diameter widening of the small diameter portion and a stopper rubber portion on a rebound side on a bottom surface of the flanged portion are divided leaving a thin rubber portion on the outer circumferential surface of the stepped portion, the thin rubber portion having a thin wall thickness and the movement of the thin rubber portion being restricted by an adhesive.

6. The manufacturing method for the upper support according to claim 4, wherein the rubber elastic body includes an upward scooped-out portion forming an annular shape in a circumferential direction and oriented upward from a bottom surface, wherein:
the upward scooped-out portion is between the tubular portion of the cup piece and the outer tubular portion of the outer piece, and
the main body rubber portion is formed on the upper side of the scooped-out portion.

7. The manufacturing method for the upper support according to claim 6, wherein the diameter widening jig includes an outer circumferential surface on the front end of the press-fitting side as a tapered portion having a shape in which an outer diameter gradually reduces toward the forefront of the diameter widening jig,
the tapered portion being provided with a shape in which a top edge position is positioned even with or below a top end of the upward scooped-out portion in a state where press-fitting of the diameter widening jig has been completed.

8. The manufacturing method for the upper support according to claim 7, wherein the diameter widening jig widens with the tapered portion the diameter of a portion of the small diameter portion corresponding to the upward scooped-out portion.

9. The manufacturing method for the upper support according to claim 4, wherein:
the outer piece includes a stopper abutment on a rebound side opposite the flanged portion, the stopper abutment being continuous with the outer tubular portion;
the rubber elastic body includes a top rubber portion on an upper side of the main body rubber portion, the top rubber portion having a coating rubber layer which coats a top surface of the stopper abutment;
the rubber elastic body includes a first scooped-out portion at an axial direction position where the stepped portion is positioned prior to the diameter widening, the first scooped-out portion having an annular shape along a circumferential direction and oriented in a radially inward direction from the outer circumferential surface toward the stepped portion;
the rubber elastic body is vertically divided by the first scooped-out portion in an axial direction across the entire radial direction such that the main body rubber portion and the top rubber portion are divided from the stopper rubber portion on the rebound side on the bottom surface side of the flanged portion, leaving a thin rubber portion on the outer circumferential surface of the stepped portion, the thin rubber portion having a thin wall thickness and the movement of the thin rubber portion being restricted by an adhesive;
the outer tubular portion has an inclined shape widening downward where the gap with the tubular portion of the cup piece widens toward the bottom;
the rubber elastic body includes an upward scooped-out portion forming an annular shape in a circumferential direction and oriented upward from a bottom surface, the upward scooped-out portion being between the tubular portion of the cup piece and the outer tubular portion of the outer piece; and
the main body rubber portion is formed on the upper side of the first scooped-out portion.

10. The manufacturing method for the upper support according to claim 1, wherein, when the diameter widening jig is press-fitted into the small diameter portion to widen the diameter of the small diameter portion:
the diameter widening jig is used having a hole opening on the front end surface on the press-fitting side and extending in an axial direction from the front surface;
a receiving jig receiving the base portion of the cup piece from below is prepared, then a guide pin is projected upward from the receiving jig;
in a state where the base portion is received by the receiving jig and the guide pin is projected upward from the insertion hole on the base portion, while inserting the guide pin into the hole, the diameter widening jig is press-fitted downward into the small diameter portion to widen the diameter of the small diameter portion;
thereafter, the receiving jig is removed along with the guide pin, and a diameter-widened article is vertically flipped, then, in a state where the flanged portion of the cup piece is received from below at a second receiving jig, an extraction pin is pushed downward into the hole of the diameter widening jig, which is in a fixed state press-fitted into the small diameter portion, in order to remove the diameter widening jig from the cup piece.

11. An upper support comprising:
(a) a cup piece forming an inner piece;
(b) an outer piece disposed around the inner piece in a position offset in a radial direction; and
(c) a rubber elastic body integrally vulcanize adhered to the inner piece and the outer piece in a state where the inner piece and the outer piece are elastically connected to the rubber elastic body, wherein
the upper support is anchored to a piston rod of a shock absorber on the inner piece side, and the upper support is anchored to a vehicle body on the outer piece side, the upper support elastically connecting the piston rod and the vehicle body and acting to prevent vibration,
the cup piece is directly vulcanize adhered to the rubber elastic body, the cup piece including:
a tubular portion;
a base portion having a piston rod insertion hole in a center of a bottom end of the tubular portion; and
a flanged portion jutting in a radially outward direction at a top end of the tubular portion on a side opposite to the base portion, and
the lower portion of the base portion side in the cup piece is a pre-compression imparting, partially diameter widened portion, widened in an axial direction to impart pre-compression to a portion corresponding to the lower portion in the rubber elastic body.

* * * * *